United States Patent
Orita et al.

(10) Patent No.: US 7,330,775 B2
(45) Date of Patent: Feb. 12, 2008

(54) LEGGED MOBILE ROBOT CONTROLLER, LEGGED MOBILE ROBOT AND LEGGED MOBILE ROBOT CONTROL METHOD

(75) Inventors: Atsuo Orita, Wako (JP); Tadaaki Hasegawa, Wako (JP); Kenichiro Sugiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/636,465

(22) Filed: Dec. 11, 2006

(65) Prior Publication Data
US 2007/0150105 A1 Jun. 28, 2007

(30) Foreign Application Priority Data
Dec. 12, 2005 (JP) ............................. 2005-358353

(51) Int. Cl.
*G06F 19/00* (2006.01)
(52) U.S. Cl. ............. 700/245; 700/246; 700/247; 700/248; 700/249; 700/250; 700/251; 700/252; 700/253; 700/254; 700/255; 318/568.11; 318/568.12; 318/568.13; 318/568.14; 318/568.16; 901/2; 901/16; 901/23
(58) Field of Classification Search ........ 700/245, 700/246, 247, 248, 249, 250, 251, 252, 253, 700/254, 255, 256, 257, 258, 259; 318/568.11, 318/568.12, 568.13, 568.14, 568.15, 568.16, 318/568.17; 901/2, 8, 9
See application file for complete search history.

(56) References Cited
U.S. PATENT DOCUMENTS
2005/0055131 A1* 3/2005 Mikami et al. ............ 700/245
2005/0165507 A1* 7/2005 Shimizu et al. ............ 700/245
2005/0240307 A1* 10/2005 Kuroki et al. ............. 700/245
2007/0016329 A1* 1/2007 Herr et al. ................. 700/250
2007/0185618 A1* 8/2007 Nagasaka .................. 700/245

FOREIGN PATENT DOCUMENTS
| EP | 1 486 298 A1 | 12/2004 |
| EP | 1 510 302 A2 | 3/2005 |
| EP | 1 671 874 A2 | 6/2006 |
| JP | 2004-160594 | 6/2004 |
| JP | 2004-167674 | 6/2004 |

OTHER PUBLICATIONS
European Search Report application No. 06025345 dated May 7, 2007.

* cited by examiner

*Primary Examiner*—Thomas Black
*Assistant Examiner*—McDieunel Marc
(74) *Attorney, Agent, or Firm*—Squire, Sanders & Dempsey L.L.P.

(57) ABSTRACT

A legged mobile robot, a legged mobile robot controller and a legged mobile robot control method are provided to perform a loading operation to load a gripped object in parallel on a target place having a height where a stretchable range of arm portions of the legged mobile robot is enhanced with no operator's handling. The legged mobile robot includes the arm portions having links for gripping an object, and leg portions having links for moving, and the arm and the leg portions are joined to a body thereof. The legged mobile robot controller includes a data acquisition unit, a whole-body cooperative motion control unit and a loading detection unit, and controls motions of the legged mobile robot based on posture/position data regarding a posture/position of each link of the legged mobile robot and on an external force data regarding an external force affecting the arm portions.

17 Claims, 12 Drawing Sheets

TRANSFER OPERATION

LOADING OPERATION

RETURN OPERATION

REFERENCE POSTURE
(REFERENCE POLYHEDRON)

STICK-OUT
AT APEXES

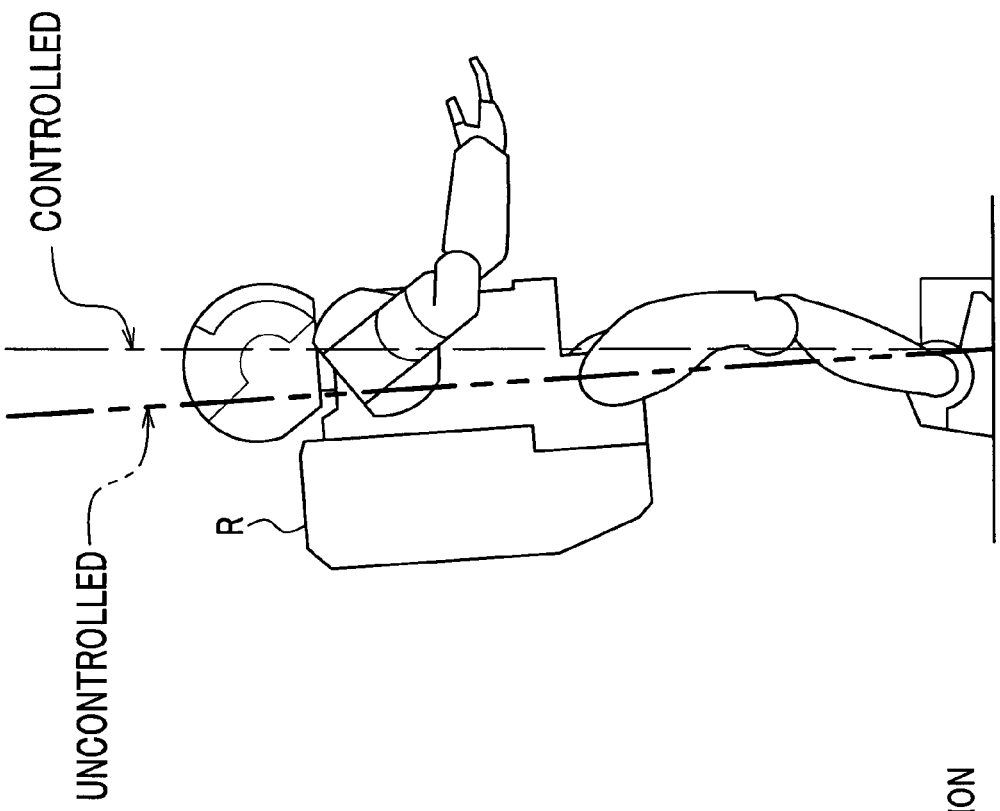
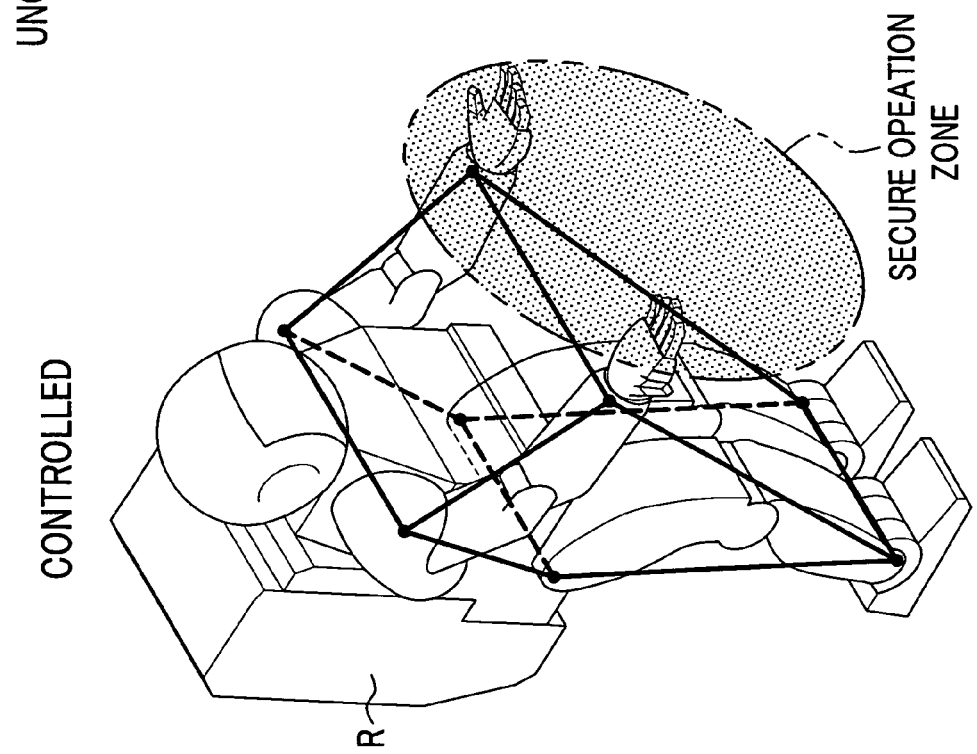

COMPENSATE WRIST MOVABLE ANGLE
UNCONTROLLED — TARGET POSTURE

CONTROLLED — MAINTAINING TARGET POSTURE

FOLLOWING COMPLIANCE CONTROL OF ARM
UNCONTROLLED — WRIST POSITION

CONTROLLED
HIP FOLLOWS FORCE ON GRIPPER ENDS

UNCONTROLLED

CONTROLLED

LEGGED MOBILE ROBOT CONTROLLER, LEGGED MOBILE ROBOT AND LEGGED MOBILE ROBOT CONTROL METHOD

CROSS-REFERENCE TO RELATED APPLICATION

This application claims the benefit of Japanese Patent Application No. 2005-358353 filed on Dec. 12, 2005, the disclosure of which is incorporated herein by reference.

BACKGROUND OF THE INVENTION

1. Field of the Invention

The present invention relates to a legged mobile robot using leg portions, a legged mobile robot controller for controlling the legged mobile robot, and a legged mobile robot controlling method.

2. Description of the Related Art

There have been known legged mobile robots walking or running (hereinafter referred to as "moving") by legs. Such robots usually have a human-like figure with a head, arm portions, a body and leg portions, thereby encouraging natural communication with humans.

Robots, specifically industrial robots, usually assemble components, grip an object and transfer a product, or the like.

Those industrial robots are generally constituted merely of arm portions for assembling components or for grasping an object (often referred to as a "robot hand" or "robot arm")

Such a "robot hand" as disclosed in JP2004-160594A is designed so as to determine a grasp motion by calculating an approximate figure of an object to be grasped, based on a touch sensor, an open angle sensor or the like.

In addition, such a "robot grip controller" as disclosed in JP2004-167674A is designed to detect on an external force sensor a value of an external force affecting a robot hand that grips an object, and increase or decrease a grip force of the robot hand to grip the object in accordance with changes of the external value, thereby receiving and handing out the object.

If a legged mobile robot is provided with those well-known robot hands or a grip controller so as to grip an object and load the object on an appropriate place under an autonomous control with no operator's control, the legged mobile robot cannot keep the object in parallel and tilt it, resulting in losing a balance in keeping the posture thereof.

In particular, there have been a disadvantage that, if the legged mobile robot grips the object with the arms thereof and loads the gripped object on the appropriate place (e.g. on a table with a predetermined height), a height of the appropriate place on which the object is loaded is limited within a stretchable range of the robot's arms, compared to a conventional robot arm.

The present invention has an object to provide a legged mobile robot controller, a legged mobile robot and the legged mobile robot control method, which make it possible to load a gripped object on a target place having a height where a stretchable range of the arms is enhanced, while maintaining the posture of the legged mobile robot in accordance with a predetermined posture with no operator's handling, thereby solving the above disadvantage.

SUMMARY OF THE INVENTION

In one aspect of the present invention, there is provided a legged mobile robot controller for controlling a legged mobile robot comprising arm portions for gripping an object, each arm potions having links; leg portions for moving, each leg portion having links; a main body of the legged mobile robot joined to the arm portions and the leg portions, based on posture/position data regarding a posture and a position of each link of the legged mobile robot and on an external force data regarding an external force affecting the arm portion or portions thereof.

The legged mobile robot controller includes a data acquire unit for acquiring the posture/position data and the external force data; a whole-body cooperative motion control unit for controlling motions of the leg portions in accordance with motions of the arm portions, based on the posture/position data acquired by the data acquire unit, when the legged mobile robot loads the gripped object with the arm portions on a target place; and a loading detection unit for detecting that the gripped object with the arm portions has been loaded on the target place by the motions controlled by the whole-body cooperative motion control unit, based on the external force data acquired by the data acquire unit.

In this aspect, the whole-body cooperative motion control unit controls in such a manner that, if the loading detection unit detects that the gripped object is not loaded on the target place when a position of the arm is put down or stretched, each link of the leg portions is bent at part where each link is jointed to each other.

In another aspect of the present invention, there is provided a legged mobile robot controller for controlling a legged mobile robot comprising arm portions for gripping an object, each arm potion having links; leg portions for moving, each leg portion having links; a main body of the legged mobile robot joined to the arm portions and the leg portions, based on posture/position data regarding a posture and a position of each link of the legged mobile robot and on an external force data regarding an external force affecting the arm portion or portions thereof.

The legged mobile robot controller includes a data acquire unit for acquiring the posture/position data and the external force data; a whole-body cooperative motion control unit for controlling motions of the leg portions and the arm portions when the legged mobile robot R loads the object gripped with the arm portions on a target place based on the posture/position data acquired by the data acquire unit, the motions of the leg portions and the arm portions being controlled in such a manner that: a polyhedron is formed by connecting, as apexes thereof, a movable point of each part or link of the arm portions and the leg portions, and if the polyhedron sticks out at either of a first pair or a second pair of the apexes thereof which are disposed diagonally to each other, the polyhedron also sticks out at the other pair of the apexes, so as to compensate the stick-out of the polyhedron at the apexes each other; and a loading detection unit for detecting that the gripped object with the arm portions is loaded on the target place by the motions controlled by the whole-body cooperative motion control unit, based on the external force data acquired on the data acquire unit.

In this aspect, the apexes of the polyhedron at least includes positions of gripper ends that are part of the arm portion; movable points of the links at which the arm portions and the main body are joined to each other; movable points of the links at which the leg portions and the main body are joined to each other; and positions of heels or knees that are part of the leg portions.

Furthermore in another aspect of the present invention, there are provided legged mobile robot control methods for providing controls by using the above legged mobile robot controllers, as well as a legged mobile robot including the above legged mobile robot controllers.

Other features and advantages of the present invention will become more apparent from the following detailed descriptions of the invention when taken in conjunction with the accompanying exemplary drawings.

BRIEF DESCRIPTION OF THE DRAWINGS

FIGS. 9A and 9B are drawing showing a difference between an uncontrolled case and a controlled case by the legged mobile robot controller, regarding securing an operation zone.

DETAILED DESCRIPTION OF THE PREFERRED EMBODIMENTS

Detailed descriptions will be given on an embodiment of the present invention, with reference to attached drawings.

The descriptions will be given first on outline of a legged mobile robot, and drive mechanism and configuration of the legged mobile robot, next on a configuration of the legged mobile robot controller, and then on an overall operation thereof from receiving an object to loading it. Thereafter, detailed descriptions will also be given on an operation of loading an object, which is performed by the legged mobile robot.

Outline of Legged Mobile Robot

Figure 1:
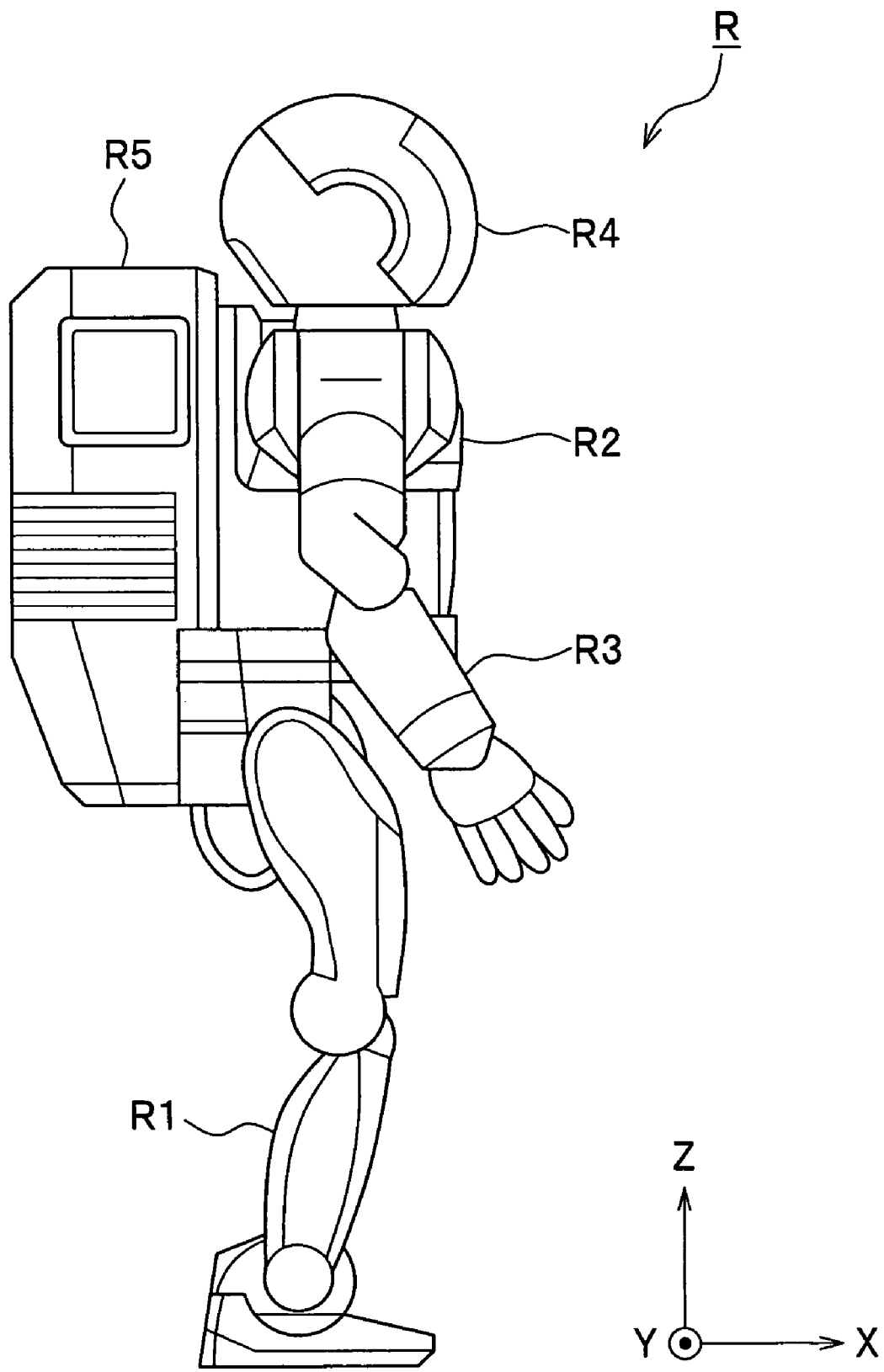
FIG. 1 is a side elevational view of the outline of a legged mobile robot.

FIG. 1 is a schematic diagram of the outline of a legged mobile robot R.

As shown in FIG. 1, the legged mobile robot R is an autonomous two-legged mobile robot. The legged mobile robot R stands up with two-leg portions R1 (only one leg is shown in FIG. 1) and is provided with an body R2, two arm portions R3 (only one arm portion is shown in FIG. 1) and a head R4 in such a manner that the robot R autonomously moves (walks or runs, etc.) as human does. The legged mobile robot R is provided with a controller housing unit R5 for controlling operations on the leg portions R1, the body R2, the arm portions R3 and the head R4 on a back thereof (back side of the body R2). Hereinafter, it is assumed that a back and forth direction of the legged mobile robot R is an X axis, a lateral direction thereof is a Y axis and a vertical direction is a Z axis.

Drive Mechanism of Legged Mobile Robot

Figure 2:
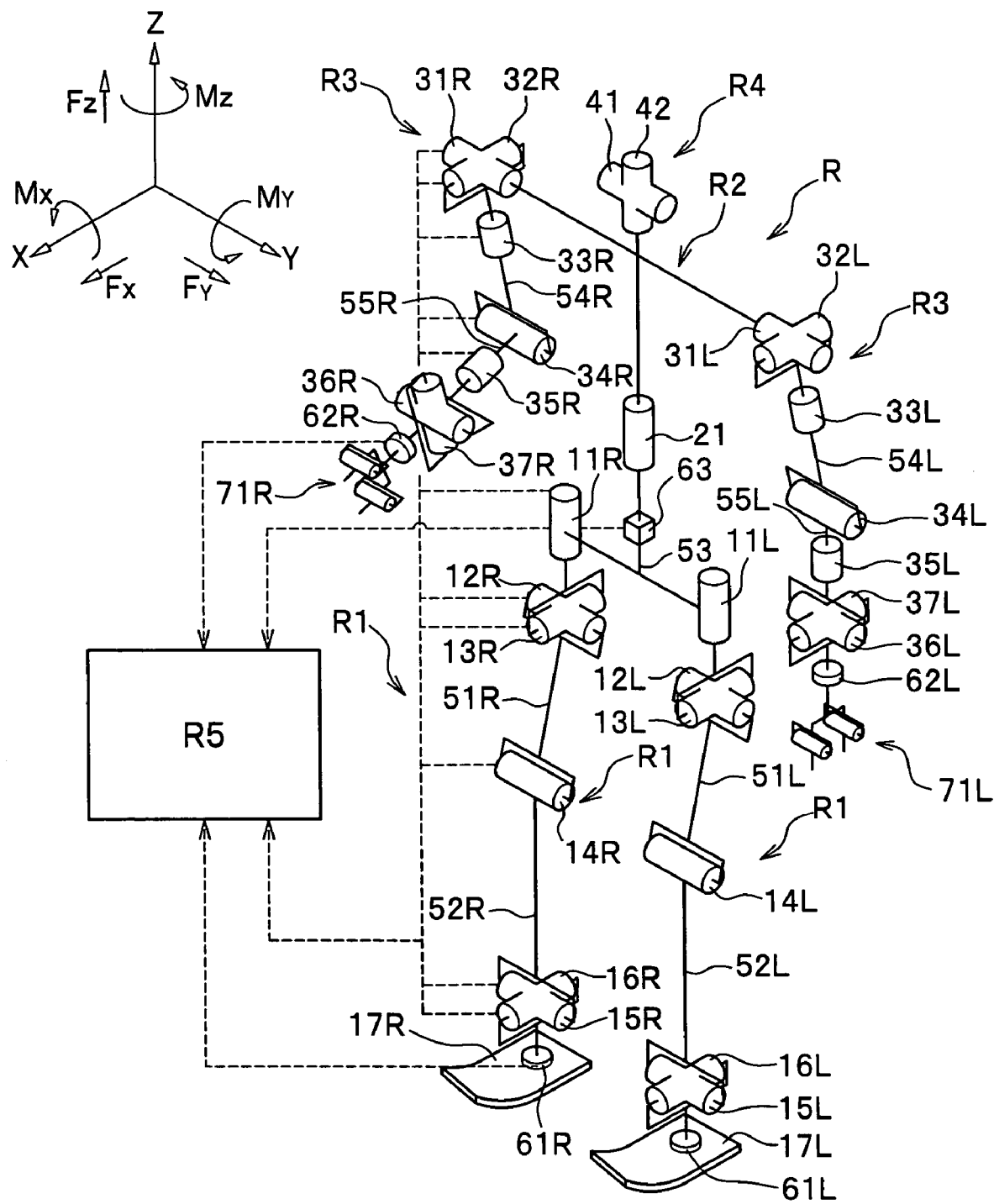
FIG. 2 is a schematic perspective view showing a drive mechanism of the legged mobile robot of FIG. 1.

A description will be given on a drive mechanism of the legged mobile robot R. FIG. 2 is a schematic perspective view showing a drive mechanism of the legged mobile robot R as shown in FIG. 1. Note that each joint shown in FIG. 2 is depicted with an electric motor that drives each joint of the legged mobile robot R.

<Leg Portions R1>

As shown in FIG. 2, each leg portion R1 on the right and left sides is provided with six joints 11R (L) to 16R (L) (hereinafter "R" denotes the right side and "L" denotes the left side, which are omitted occasionally). The twelve joints on the right and left sides in total are constituted of hip joints 11R and 11L on the hip (joint part between the body R2 and the leg R1) for swirling the leg portions (about the Z axis), hip joints 12R, 12L about a pitch axis (Y axis) of the hip, hip joints 13R, 13L about a roll axis (X axis) of the hip, knee joints 14R, 14L about a pitch axis (Y axis) on knees, ankle joints 15R, 15L about a pitch axis (Y axis) of ankles, and ankle joints 16R, 16L about a roll axis (X axis) of the ankles. Feet 17R, 17L are provided beneath the leg portions R1.

Each leg portion R1 has the hip joints 11R(L), 12R(L), 13R(L), the knee joint 14R(L) and the ankle joints 15R(L), 16R(L). The hip joints 11R(L) to 13R(L) and the knee joint 14R(L) are jointed through thigh links 51R, 51L respectively. The knee joint 14R(L) and the ankle joints 15R(L), 16R(L) are jointed through the leg links 52R, 52L respectively.

<Body R2>

As shown in FIG. 2, the body R2 is a main body part of the legged mobile robot R and is jointed to the leg portions R1, the arm portions R3 and the head R4. That is, the body R2 (body link 53) is jointed to the leg portions R1 via the hip joints 11R(L) to 13R(L). The body R2 is also jointed to the arm portions R3 via shoulder joints 31R(L) to 33R(L). The body R2 is jointed via neck joints 41, 42 (described later) to the heard R4, and has joint 21 for swirling the body (about the Z axis).

<Arm Portions R3>

As shown in FIG. 2, each arm portion R3 on the left and right sides is constituted of seven joints 31R(L) to 37R(L). The fourteen joints on the right and left sides in total are constituted of shoulder joints 31R 31L about a pitch axis (Y axis) of the shoulders (joint part between the shoulder R3 and the body R2), shoulder joints 32R, 32L about a roll axis (X axis) of the shoulders, shoulder joints 33R, 33L for swirling the arm portions (about the Z axis), elbow joints 34R, 34L about a pitch axis (Y axis) of elbows, arm joints 35R, 35L for swirling wrists (about the Z axis), wrist joints 36R, 36L about a pitch axis (Y axis) of the wrists, and wrist joints 37R, 37L about a roll axis (X axis) of the wrists. The arm portions R3 is provided with grippers (hands) 71R, 71L at each end thereof.

Specifically, each arm portion R3 on the right and left sides is constituted of the shoulder joints 31R(L), 32R(L), 33R(L), the elbow joints 34R(L), the arm joints 35R(L) and the wrist joints 36R(L), 37R(L). The shoulder joints 31R(L) to 33R(L) and the elbow joint 34R(L) are jointed through a upper arm link 55R(L) respectively.

<Head R4>

As shown in FIG. 2, the head R4 is constituted of a neck joint 41 of the neck (joint part between the head R4 and the body R2) about a Y axis, and the neck joint 42 about a Z axis of the neck. The neck joint 41 serves for defining a title angle of the heard R4. The neck joint 42 serves for defining a pan angle of the head R4.

The above-mentioned drive mechanism provides the arm portions R1 on the right and left sides with twelve degree-of-freedoms in total, thereby driving the twelve joints 11R(L) to 16R(L) at an appropriate angle respectively when the legged mobile robot R moves. Accordingly a desirable motion can be provided for the leg portions R1, so that the legged mobile robot R can move as desired in the three dimensional space. The arm portions R3 on the right and left sides are provided with fourteen degree-of-freedoms in total, thereby driving the fourteen joints 31R(L) to 37R(L) at an appropriate angle respectively when the legged mobile robot R performs a desired operation, so that the legged mobile robot R can operate as desired.

A conventional 6-axis force sensor 61R(L) is provided between the ankle joints 15R(L), 16R(L) and the foot 17R(L). The 6-axis force sensor 61R(L) detects three direction components of a floor reaction force Fx, Fy, Fz that affect the legged mobile robot R from the floor, and three direction components of a moment Mx, My, Mz.

A conventional 6-axis force sensor 62R(L) is provided between the wrist joints 36R(L), 37R(L) and the gripper 71R(L). The conventional 6-axis force sensor 62R(L) detects three direction components of a floor reaction force Fx, Fy, Fz that affect the gripper 38 R(L) of the legged mobile robot R, and three direction components of a moment Mx, My, Mz.

The body R2 is provided with a tilt sensor 63, which detects a tilt relative to the gravity axis (Z axis) of the body R2 and an angular velocity thereof.

The electric motor of each joint provides relative displacement between the thigh link 51R(L) and the leg link 52R(L) or the like by using reduction gears (not shown) to reduce and increase the motor rotation speed. A joint angle detector (such as a rotary encoder) detects an angle at each joint.

The controller housing unit R5 stores an autonomous motion controller 150 (described later, see FIG. 3), a gripper controller 160, a wireless communication unit 170, a main controller 200 and a battery (not shown), etc. Data detected by each sensor 61 to 63 is transmitted to each controller or control unit in the controller housing unit R5 and to the legged mobile robot controller 1 (described later). Each electric motor is actuated by drive instruction signals transmitted from each control unit.

Configuration of Legged Mobile Robot

Figure 3:
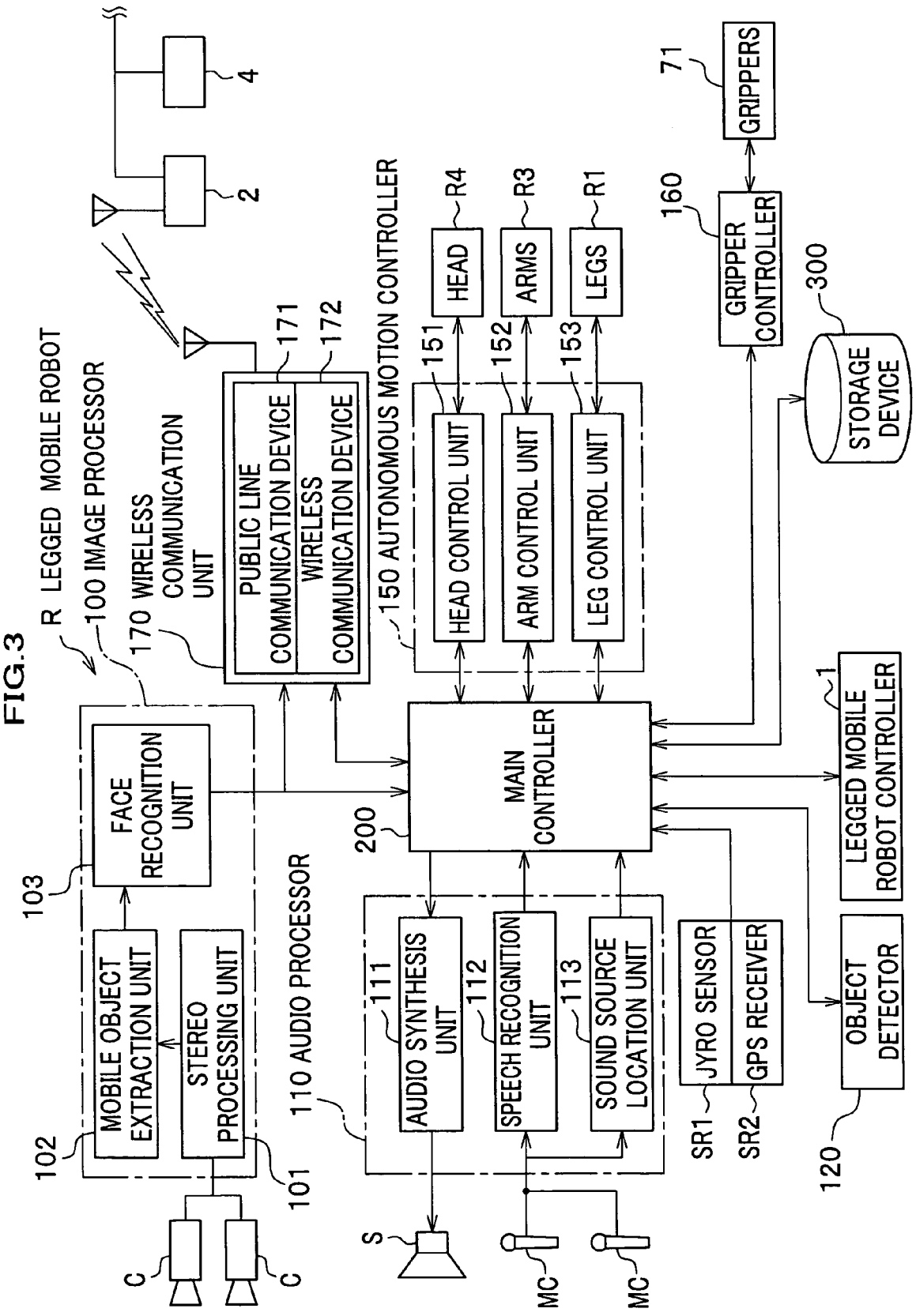
FIG. 3 is a block diagram showing a configuration of the legged mobile robot of FIG. 1.

FIG. 3 is a block diagram showing a configuration of the legged mobile robot R of FIG. 1. As shown in FIG. 3, the legged mobile robot R is constituted of cameras C, C, a speaker S, microphones MC, MC, an image processor 100, an audio processor 110, an object detector 120, an autonomous motion controller 150, a gripper controller 160, a wireless communication unit 170, a main controller 200, a storage device 300 and the legged mobile robot controller 1, as well as the leg portions R1, the arm portions R3 and the head R4.

The legged mobile robot R is also provided with a gyro sensor SR1 and a GPS receiver SR2. The gyro sensor SR1 is used for detecting data on directions (direction data) of the legged mobile robot R. The GPS receiver SR2 is used for detecting data on positions (position data) of the legged mobile robot R. Data detected by the gyro sensor SR1 and the GPS receiver SR2 is outputted to the main controller 200, which is used for determining operations of the legged mobile robot R.

<Cameras>

The cameras C, C read images as digital data, and color CCD cameras may be used for the cameras C, C, for example. The cameras C, C are disposed on the right and left sides in parallel, and images taken by the cameras C, C are outputted to the image processor 100. The cameras C, C, the speaker S and microphones MC, MC are all installed in the head R4.

<Image Processor>

The image processor 100 is used for processing images taken by the cameras C, C, and recognizes obstacles and persons nearby based on the processed images, so as to grasp conditions surrounding the legged mobile robot R. The image processor 100 is constituted of a stereo processing unit 101, a mobile object extraction unit 102 and a face recognition unit 103.

The stereo processing unit 101 is used for performing pattern matching based on either of two images taken by the right and left cameras C, C, calculating parallax between each corresponding pixel in the right and left images, so as to generate a parallax image and output the generated parallax image and the original image to a mobile object extracting unit 102. Note that the parallax mentioned herein represents distance from the legged mobile robot R to an object of which images are taken by the cameras C, C.

The mobile object extraction unit 102 is used for extracting a mobile object in the image taken by the cameras C, C based on the data outputted from the stereo processing unit 101. An aim of extracting the mobile object is to assume that the mobile object is a person and recognize a face of the person.

For the purpose of extracting the mobile object, the mobile object extraction unit 102 stores several (image) frames in the past, compares previous frames with a latest frame to perform pattern matching, calculates motion amount of each pixel, and generates a motion amount image based on the calculated motion amount. From results of the parallax image and the calculated motion amount image, if it is determined that there are pixels with greater motion amount within a predetermined distance range, the mobile object extraction unit 102 assumes that there is a person at the position of the pixels, extracts the mobile object based on the parallax image only within the predetermined distance range, and outputs the image of the mobile object to the face recognition unit 103.

The mobile object extraction unit 102 also calculates a height of the extracted mobile object and outputs data on the height to the face recognition unit 103. In other words, the mobile object extraction unit 102 determines a position of a person (the mobile object) relative to the legged mobile robot R, and his or her height as well.

The face recognition unit 103 extracts areas in skin color from the extract mobile object and recognize a face position based on a size, shape and the like of the extracted part. Similarly, a hand position is recognized based on a size, shape and the like of the area in skin color.

Data on the position of the recognized face is outputted to the main controller 200 and to the wireless communication unit 170, and then transmitted to a station 2 (for performing wireless communicating with the legged mobile robot R), as data for use when the legged mobile robot R moves and communicates with the recognized person.

<Speaker>

The speaker S outputs speech sounds based on speech sound data generated by an audio synthesis unit 111 (described later)

<Microphones>

The microphones MC, MC collect sounds surrounding the legged mobile robot R. The collected sounds are outputted to a speech recognition unit 112 and a sound source location unit 113 (both described later).

<Audio Processor>

The audio processor 110 is constituted of an audio synthesis unit 111, the speech recognition unit 112 and the sound source location unit 113.

The audio synthesis unit 111 is used for generating speech sound data from character information, in accordance with instructions on speech behavior that is determined by and outputted from the main controller 200, and outputs the generated speech sound signals to the speaker S. When generating the speech sound data, a mapping scheme may be used to provide a correlation between the character information and the speech sound data that are previously stored.

The speech recognition unit 112 is used for receiving speech sound data through the microphones MC, MC, generates character information from the speech sound data by using the mapping data between the speech sounds and the character information that are previously stored, and outputs the generated character information to the main controller 200.

The sound source location unit 113 determines a source sound location (distance and direction from the legged mobile robot R).

<Object Detector>

The object detector 120 detects whether or not there is an object to be detected (not shown) carrying a detection tag (not shown) in the vicinity of the legged mobile robot R, and if the object is detected, determine a location of the detected object.

<Autonomous Motion Controller>

The autonomous motion controller 150 is constituted of a head control unit 151, an arm control unit 152 and a leg control unit 153.

The head control unit 151 drives the head R4 in accordance with instructions sent from the main controller 200, and the arm control unit 152 drives the arm portions R3 in accordance with instructions sent from the main controller 200, and the leg control unit 153 drives the leg portions R1 in accordance with instructions sent from the main controller 200.

<Grip Control Unit>

The gripper controller 160 drives grippers 71 in accordance with instruction sent from the main controller 200. The grippers 71 have a pair of the grippers 71R, 71L (see FIG. 2), and the pair of the grippers 71R, 71L are disposed in a mirror-symmetrical manner.

Each gripper 71 is provided with an external force detector (not shown) for detecting external force affecting the gripper 71. A 6-axis force sensor may be used as an external force detector. The 6-axis force sensor is capable of detecting a direction of the external force, and is also capable of detecting a force Fx in the X axis direction, a force Fy in the Y axis direction and a force Fz in the Z axis direction, respectively.

<Wireless Communication Device>

The wireless communication unit 170 is connected to the station 2 for performing data communication with a robot manager 4 that manages the legged mobile robot R. The wireless communication unit 170 includes a public line communication device 171 and a wireless communication device 172.

The public line communication device 171 is used as a wireless communication means using public lines such as cellular phone line and PHS (Personal Handyphone System) line. Meanwhile, the wireless communication device 172 is used as a short distance wireless communication means using wireless LAN compliant with IEEE802.11b.

The wireless commutation unit 170, in accordance with a connection request from the robot manager 4, selects either the public line communication device 171 or the wireless communication device 172 so as to perform data communication with the robot manager 4.

<Main Controller>

The main controller 200 serves as providing comprehensive control on the legged mobile robot R, based on various signals and data inputted from the gyro sensor SR1, the GPS receiver SR2, the image processor 100, the audio processor 110, the object detector 120, the autonomous motion controller 150, the gripper controller 160, the wireless communication unit Although the embodiment of the present invention employs a structure in which the main controller 200 and the legged mobile robot controller 1 are implemented separately, each control unit included in the legged mobile robot controller 1 may be incorporated in the main controller 200.

<Storage Device>

The storage device 300 is constituted of common storage media, and stores person data, map data, object data and speech data.

The person data is associated with data regarding a person or persons existing within a zone where the legged mobile robot R moves (moving zone). For example, the person data may include a person identifier (ID), a name, belongings, a tag identifier, a usual location of the person, desk locations, face images and the like.

The map data is associated with data regarding maps of the zone where the legged mobile robot R moves. For example, the map data may include geographical features of the moving area, locations of walls and a desk and the like.

The object data is associated with data regarding an object or objects to be transferred by the legged mobile robot R. For example, the object data may include an object identifier, a name, a sizes and weight of the object.

The speech data is associated with data used for speech uttered by the legged mobile robot R. For example, the speech data may include waveform data on speech sounds in greetings in daily conversations.

Configuration of Legged Mobile Robot Controller

Hereinafter, with reference to FIG. 4 (also FIGS. 2 and 3 if necessary), descriptions will be given on the configuration of the legged mobile robot controller 1.

Figure 4:
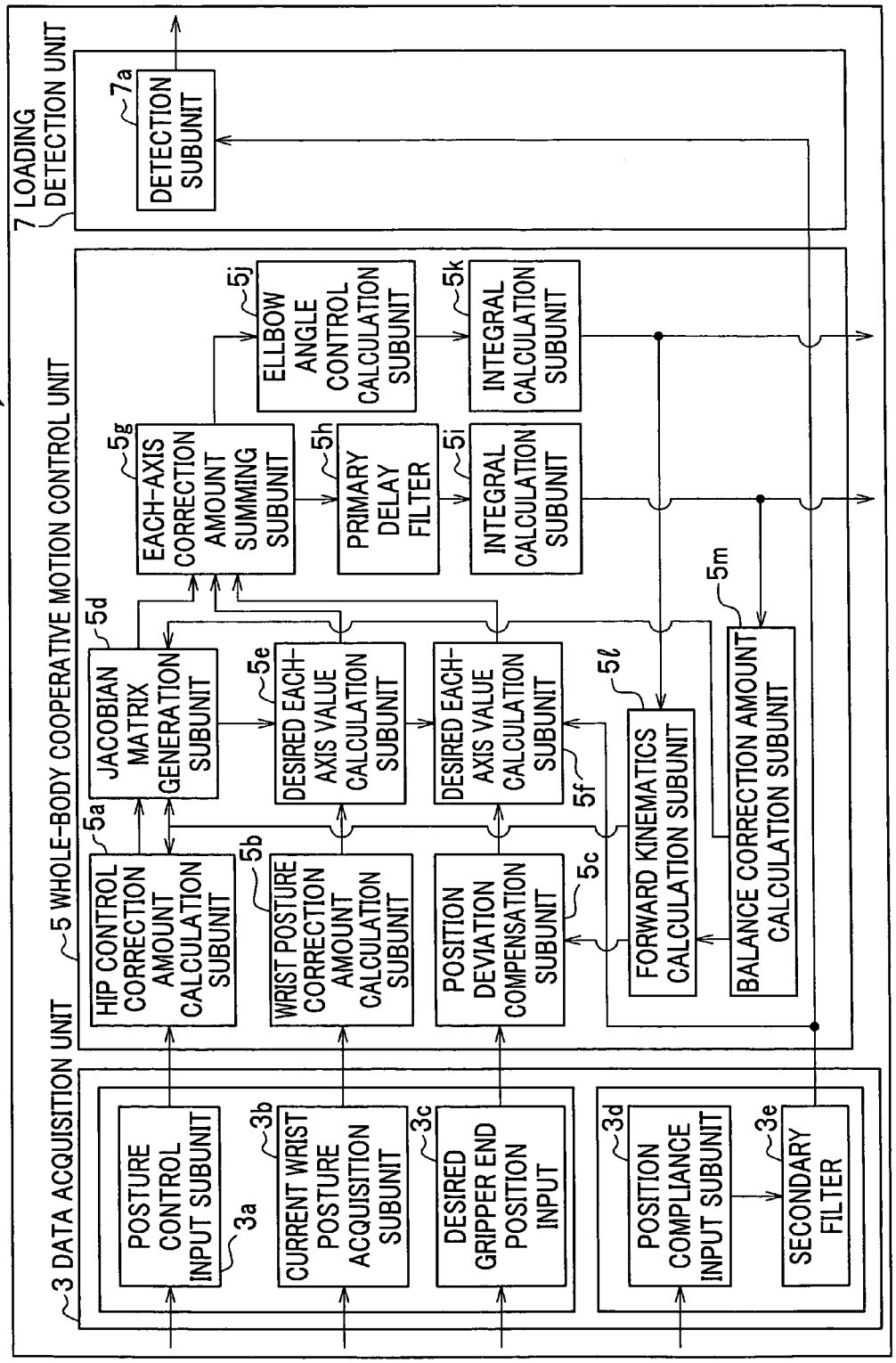
FIG. 4 is a block diagram showing the legged mobile robot controller of FIG. 3.

FIG. 4 is a block diagram showing the legged mobile robot controller 1. As shown in FIG. 4, the legged mobile robot controller 1 serves as controlling an operation of loading an object gripped by the arm portions R3 (gripper 71R(L)), which is one of various operations performed by the legged mobile robot R. The legged mobile robot controller 1 is constituted of a data acquisition unit 3, a whole-body cooperative motion control unit 5 and a loading detection unit 7.

In the present invention, it is assumed that an object to be gripped by the legged mobile robot R is a tray on which a cup or glass is placed, and a target place on which this tray is to be loaded by the legged mobile robot R is a typical table. The legged mobile robot controller 1 allows the legged mobile robot R to horizontally load the tray on the table as far as the table has a predetermined height.

In addition, the legged mobile robot controller 1 according to the embodiment of the present invention allows the legged mobile robot R, not only to load the tray on a table having an appropriately fixed height with standing straight and stretching the arm portions R3, but also to load the tray even on a table that becomes lower in height than before (but still within a predetermined range of height), by cooperatively controlling links of the whole body of the legged mobile robot R.

The data acquisition unit 3 is used for acquiring posture/position data regarding a posture and position of each link of the legged mobile robot R at the time of arriving a destination for loading the object (e.g. in front of the table), as well as external force data regarding external force applied on an end of the arm portion R3 (gripper end). The data acquisition unit 3 is constituted of a posture control input subunit 3a, a current wrist posture acquisition subunit 3b, a desired gripper end position input subunit 3c, a position compliance input subunit 3d and a secondary filter 3e.

The posture control input subunit 3a is used for inputting a positional relation between the shoulders and the hip (or waist) by inputting the posture/position data on the shoulders, that is, the shoulder joints 31R to 33R of the legged mobile robot R, and the posture/position data on the hip (or waist), that is, the joint part between the leg portions R1 and the body R2.

A current wrist posture acquisition subunit 3b is used for acquiring data on a current wrist posture from an arm control unit 152 included in the autonomous motion controller 150. The current wrist posture is defined by each angle of the arm joints 35R, 35L for swirling the wrists, the wrist joints 36R, 36L about the pitch axis (Y axis) of the wrists, the wrist joints 37R, 37L about the roll axis (X axis) of the wrists.

A desired gripper end position input subunit 3c is used for inputting a desired value for the ends of the arm portions R3 (gripper end) of the legged mobile robot R. The desired value for each gripper end is defined by a position of the gripper 71R(L) based on a mid-point between the ankle joint 16R and the ankle joint 16L.

The position compliance input subunit 3d is used for inputting external force data (compliance input value) regarding external force affecting the gripper 71R(L). The external force data increases when the gripper 71R(L) touches something. Therefore, by determining whether the external force data increases or not, it is possible to determine whether or not an object gripped by the gripper 71R(L) of the arm portion R3 is loaded on the target place, that is, the gripper 71R(L) touches the upper face of the table.

The secondary filter 3e is used for filtering the external force data inputted from the position compliance input subunit 3d into a response frequency of the arm portions R3 and a response frequency of the hip (or waist) (the joint part between the leg portions R1 and the body R2).

Based on the posture/position data (position of each link or part) and the external force data (compliance input value) acquired by the data acquisition unit 3, the whole-body cooperative motion control unit 5 controls each link (or part) to work cooperatively when the legged mobile robot R loads the object on the target table. The whole-body cooperative motion control unit 5 is constituted of a hip control correction amount calculation subunit 5a, a wrist posture correction amount calculation subunit 5b, a position deviation comparison subunit 5c, a Jacobian matrix generation subunit 5d, desired each-axis value calculation subunits 5e, 5f, an each-axis correction amount summing subunit 5g, a primary delay filter 5h, an integral calculation subunit 5i, an elbow angle control calculation subunit 5j, an integral calculation subunit 5k, a forward kinematics calculation subunit 5l and a balance correction amount calculation subunit 5m.

A cooperative motion control on each link or part by using the whole-body cooperative motion control unit 5 is executed by outputting to each link an instruction for a specific operation (such as a tray loading operation or a greeting operation of waving the arm portion R3.) in accordance with a whole-body plan that is information on predetermined serial changes in posture of the legged mobile robot R. The cooperative motion control on each link is usually referred to as a "posture control" since this control is for controlling the whole-body posture of the legged mobile robot R.

In this posture control, the legged mobile robot controller 1 outputs instructions to each link to keep the balance, for example, in such a manner: a polyhedron is formed by connecting movable points of each part or link as apexes of the polyhedron, and if a pair of apexes (for example, a "first pair of apexes") of the polyhedron sticks out, another pair of apexes (for example, a "second pair of apexes") of the polyhedron diagonally disposed to the above pair of the apexes also sticks out, so as to compensate stick-out of the apexes of the polyhedron each other.

Figure 8A:
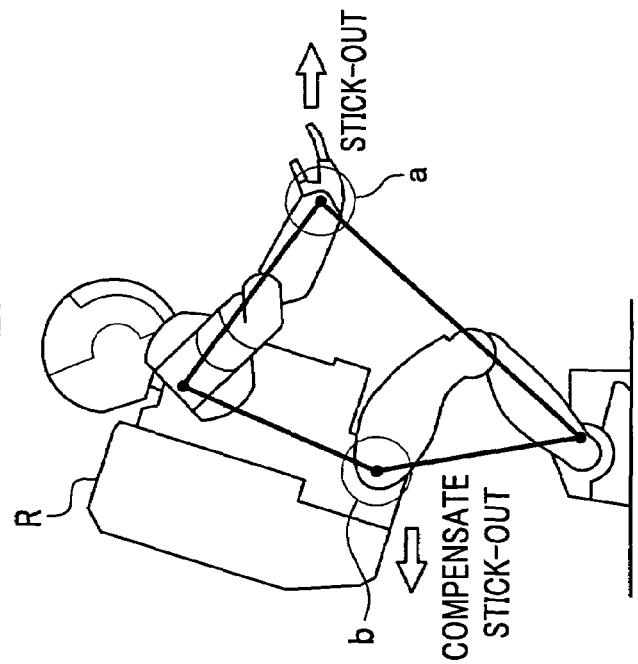
FIGS. 8A to 8C are drawings for specifically explaining how to compensate stick-out of a polyhedron formed by connecting movable points of each link of the legged mobile robot.
Figure 8B:
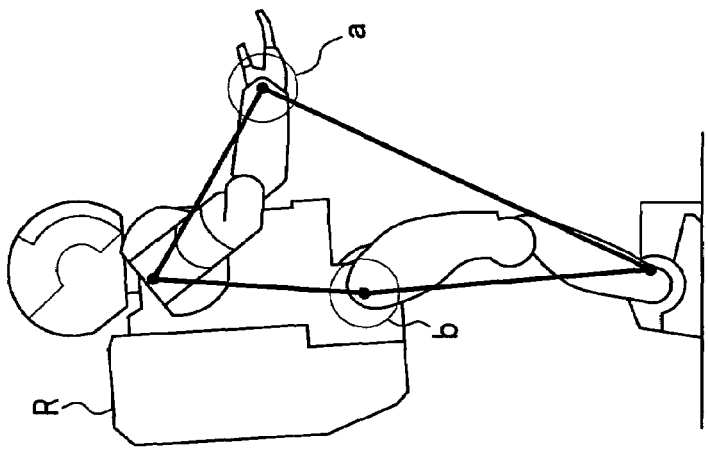
Figure 8C:
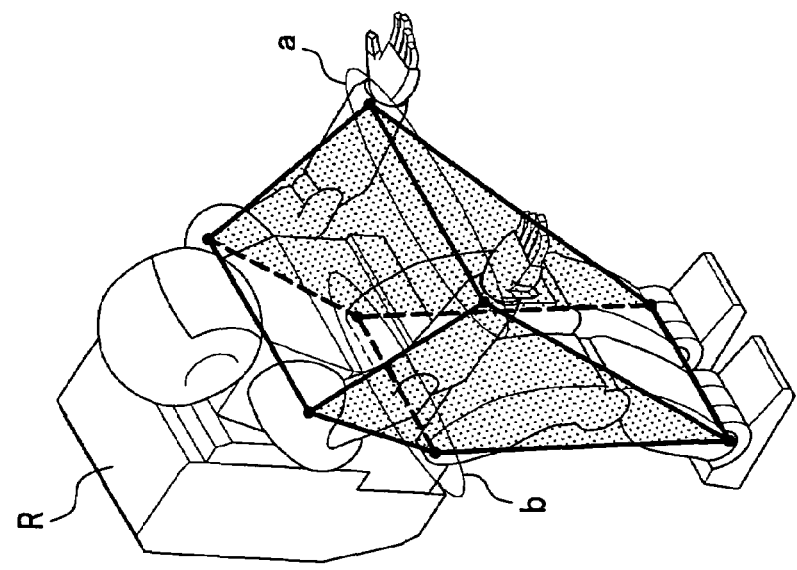

With reference to FIGS. 8A to 8C, a specific explanation will be given on how to compensate the stick-out of the polyhedron at the apexes thereof.

As show in FIG. 8A, it is assumed that a polyhedron is formed by connecting positions of the gripper ends that are part of the right and left arm portions R3, movable points of the links on which the right and left arm portions R3 and the main body R2 are jointed to each other (i.e. shoulder joints), and movable points of the links on which the right and left leg portions R1 and the main body R2 are jointed to each other (i.e. hip joints), and positions of heels or knees that are part of the right and left leg portions R1, each which becomes an apex of the polyhedron.

Note that a first side face is formed by connecting the apexes corresponding to the right gripper end, the movable point of the links on which the right arm portion R3 and the main body R2 are jointed to each other, the movable point of the link on which the right leg portion R1 and the main body R2 are jointed to each other, the position of the heel or knee that is part of the right leg portion; and a second side face is further formed by connecting the apexes corresponding to the left gripper end, the movable point of the links on which the left arm portion R3 and the main body R2 are jointed to each other, the movable point of the link on which the left leg portion R1 and the main body R2 are jointed to each other, the position of the heel or knee that is part of the left leg portion (see the hatching part of FIG. 8A). The polyhedron includes the first side face and the second side face standing opposite to the first side face.

Therefore, the first side face and the second opposite side face of the polyhedron synchronously change each shape thereof while maintaining the identical shape each other in accordance with changes in postures and position of each link of the legged mobile robot R.

FIGS. 8B and 8C show side elevation views seen from the right side of the legged mobile robot R's proceeding direction, that is, the right side face of the polyhedron.

If the polyhedron sticks out at a pair of the apexes thereof, the polyhedron also sticks out at another pair of the apexes diagonally disposed to the above pair of the apexes. For example, a posture of the legged mobile robot R after a moving operation (i.e. after arriving at the position in vicinity of the target place, described later) is set as a reference posture (also referred to as a "reference polyhedron", see FIG. 8B), as shown in FIG. 8B, and if the position of the gripper ends (i.e. first pair of the apexes, see "a" of FIG. 8) sticks out (or "is stretched") from the reference posture when the legged mobile robot R loads the gripped object on the target place, the position of the hip joints (i.e. second pair of the apexes, see "b" of FIG. 8) disposed diagonally to the position of the gripper ends also sticks out from the reference posture (see FIG. 8C).

In this way, the stick-out of polyhedron at the apexes of the polyhedron are compensated each other.

The hip control correction amount calculation subunit 5a is used for calculating correction amount (hip position correction amount) to correct the hip position (or waist position), based on the posture/position data on the shoulder joints 31R(L) to 33R(L) and the posture/position data on the hip (joint part between the leg portions R1 and the body R2), both of which are inputted (to obtain a positional relation between the shoulders and the hip) from the posture control input subunit 3a included in the data acquire unit 3, and also based on a coefficient (described later) calculated on the forward kinematics calculation subunit 51.

The wrist posture correction amount calculation subunit 5b is used for calculating correction amount to correct a posture of the wrist (wrist angle correction amount) so as to maintain the gripped object in parallel, based on a current wrist posture acquired on the current wrist posture acquisition subunit 3b, that is, on each angle of the arm joint 35R, 35L, the wrist joints 36R, 36L and the wrist joints 37R, 37L.

The wrist posture correction amount calculation subunit 5b calculates the wrist angle correction amount so that each angle of the arm joints 35R, 35L, the wrist joints 36R, 36L, the wrist joints 37R, 37L does not reach a limit thereof (to avoid the limit). Specifically, the wrist angle correction amount is calculated so as to change a plane shape defined by the both wrists (the wrist joints 36R, 36L and the wrist joints 37R, 37L) by changing a height of the elbows of the arm portions R3.

The position deviation comparison subunit 5c is used for comparing a desired value for the gripper ends inputted from the desired gripper end position input subunit 3c and a current position of the gripper ends inputted from the forward kinematics calculation subunit 51. A compared result is obtained by subtracting the current position of the gripper ends from the desired value for the gripper ends, and is outputted to the desired each-axis value calculation subunit 5f.

The Jacobian matrix generation subunit 5d is used for generating Jacobian matrix J corresponding to easiness of motion of each axis included in each link, based on the hip position correction amount calculated on the hip control correction amount calculation subunit 5a, the coefficient calculated by the forward kinematics calculation subunit 51 and a balance correction amount (described later) calculated by the balance correction amount calculation subunit 5m.

The desired each-axis value calculation subunit 5e is used for calculating a desired each axis value (instruction value to be sent to each link) for the arm portions R3 (excluding the grippers 71), based on the wrist angle correction amount calculated by the wrist posture correction amount calculation subunit 5b and the Jacobian matrix J generated by the Jacobian matrix generation subunit 5d.

The desired each-axis value calculation subunit 5f is used for calculating a desired each axis value for the grippers 71, based on the position deviation outputted from the position deviation comparison subunit 5c and the desired each axis value for the arm portions 3R calculated by the desired each-axis value calculation subunit 5e.

Note that both the desired axis value calculation subunits 5e and 5f calculate a desired each axis value by using a following formula (1), where each inputted data is x (wrist angle correction amount, position deviation, etc.), and a desired each axis value is θ.

$$\text{delta } \theta = inv(J) * \text{delta } x \tag{1}$$

Note that "inv(J)" denotes a function using the Jacobian matrix J in the above formula (1), and it is specifically represented as:

"$J^* = W-1JT(kI+JW-1JT)-1$"

The each-axis correction amount summing subunit 5g sums correction amount for each axis based on the Jacobian matrix generated on the Jacobian matrix generation subunit 5d, the desired each axis value for the arm portions R3 calculated by the desired each-axis value calculation subunit 5e, the desired each axis value for the grippers 71 calculated by the desired each-axis value calculation subunit 5f, and further based on the above summed result, calculates the desired each axis value for each axis. In other words, the each-axis correction amount summing subunit 5g calculates the desired each axis value based on the desired value inputted on the desired gripper end position input subunit 3c (inputting the desired position/posture), the current wrist posture data acquired on the current wrist posture data acquisition subunit 3b (inputting the wrist posture), and the positional relation between the shoulders and the hip inputted on the posture control input subunit 3a (inputting stick-out compensation).

The primary delay filter 5h is used for smoothing output of the desired each axis value for each axis calculated by the axis correction amount summing subunit 5g, and multiplying the desired each axis value by the transfer function (1/Ts+1 (T: time constant, s: differential operator)). The reason for delaying the output of the desired each axis value is to adjust characteristics of the legged mobile robot R's actual body motion to a model characteristics that is predetermined for the legged mobile robot R's body motion.

The integral calculation subunit 5i is used for providing an integral calculation for the desired each axis value which has been multiplied by the transfer function by the primary delay filter 5h. The result obtained by the integral calculation subunit 5i is outputted to the balance correction amount calculation subunit 5m, and via the main controller 200 to the leg control unit 153 of the autonomous motion controller 150 as well, thereby applying the result on the legged mobile robot R's motions.

Based on the desired each axis value for each axis which is calculated by the axis correction amount summing subunit 5g, the elbow angle control calculation subunit 5j calculates a desired elbow angle value, based on which the shoulder angle correction amount is calculated. The desired elbow angle value is used for setting angles of the elbow joints 34R, 34L about the pitch axis (Y axis) of each elbow. The shoulder correction amount is a correction amount for correcting angles of the shoulder joints 31R, 31L about the pitch axis (Y axis) of the shoulders (joint part between the arm portions R3 and the body R2), the shoulder joints 32R, 32L about the roll axis (X axis) of the shoulders and the shoulder joints 33R, 33L for swirling each arm portion (about the Z axis).

The integral calculation subunit 5k is used for providing an integral calculation on the shoulder angle correction amount that is calculated by the elbow angle control calculation subunit 5j. The result calculated by the elbow angle control calculation subunit 5j is outputted to the balance correction amount calculation subunit 5m, and via the main controller 200 to the arm control unit 152 of the autonomous motion controller 150, as well, thereby applying the result on the legged mobile robot R's motions.

In the integral calculation subunits 5i and 5k, a current state (before motion) is represented as "state (n−1)", state change amount in a micro time period is represented as "delta (n−1)", and a state after the motion is represented as "state (n)", where the state after the motion "state (n)" is calculated by using the following formula (2)

$$\text{state } (n) = \text{state } (n-1) + \text{delta } (n-1) \quad (2)$$

Based on the result calculated by the integral calculation subunit 5k and the balance correction amount calculated by the balance correction amount calculation subunit 5m, the forward kinematics calculation subunit 5l is used for calculating a coefficient to transform a line connecting the joints (of each link) at a joint angle into a coordinate. In other words, by using this coefficient, two links of the legged mobile robot R can be transformed into an appropriate line.

The balance correction amount calculation subunit 5m is used for calculating the balance correction amount based on the result obtained on the integral calculation subunit 5i. The balance correction amount compensates the center-of-gravity shift amount of the body R2 and the leg portions R1, that is, a moment due to the body motion that is caused when the legged mobile robot R stretches the arm portions R3.

The loading detection unit 7 is used for determining whether or not an object is loaded on the target place based on the external force data regarding external force affecting the gripper 71R(L), which is inputted by the position compliance input subunit 3d (compliance input value). The loading detection unit 7 includes a detection subunit 7a.

The determination subunit 7a is used for determining whether or not the external force data exceeds a predetermined value. The legged mobile robot controller 1 controls the object loading operation by keeping the arm portions R3 of the legged mobile robot R stretching; or by keeping the leg portions R1 thereof bent at the knee joints 14R (L) until it is determined that the external force data exceeds a predetermined value, and if it is determined that the external force data exceeds the predetermined value, it is determined the object loading operation has been completed. Then, the legged mobile robot controller 1 controls the legged mobile robot R to return to the original posture. ("return operation", described later).

According to the legged mobile robot controller 1 having such a structure as described above, it is possible to load a gripped object in parallel on a target place having a height where a stretchable range of the arm portions R3 is enhanced with no operator's handling, while maintaining the posture of the legged mobile robot R in a predetermined posture based on the posture/position data acquired by the data acquire unit 3.

Overall Operation from Receiving an Object to Loading the Object

Figure 5:
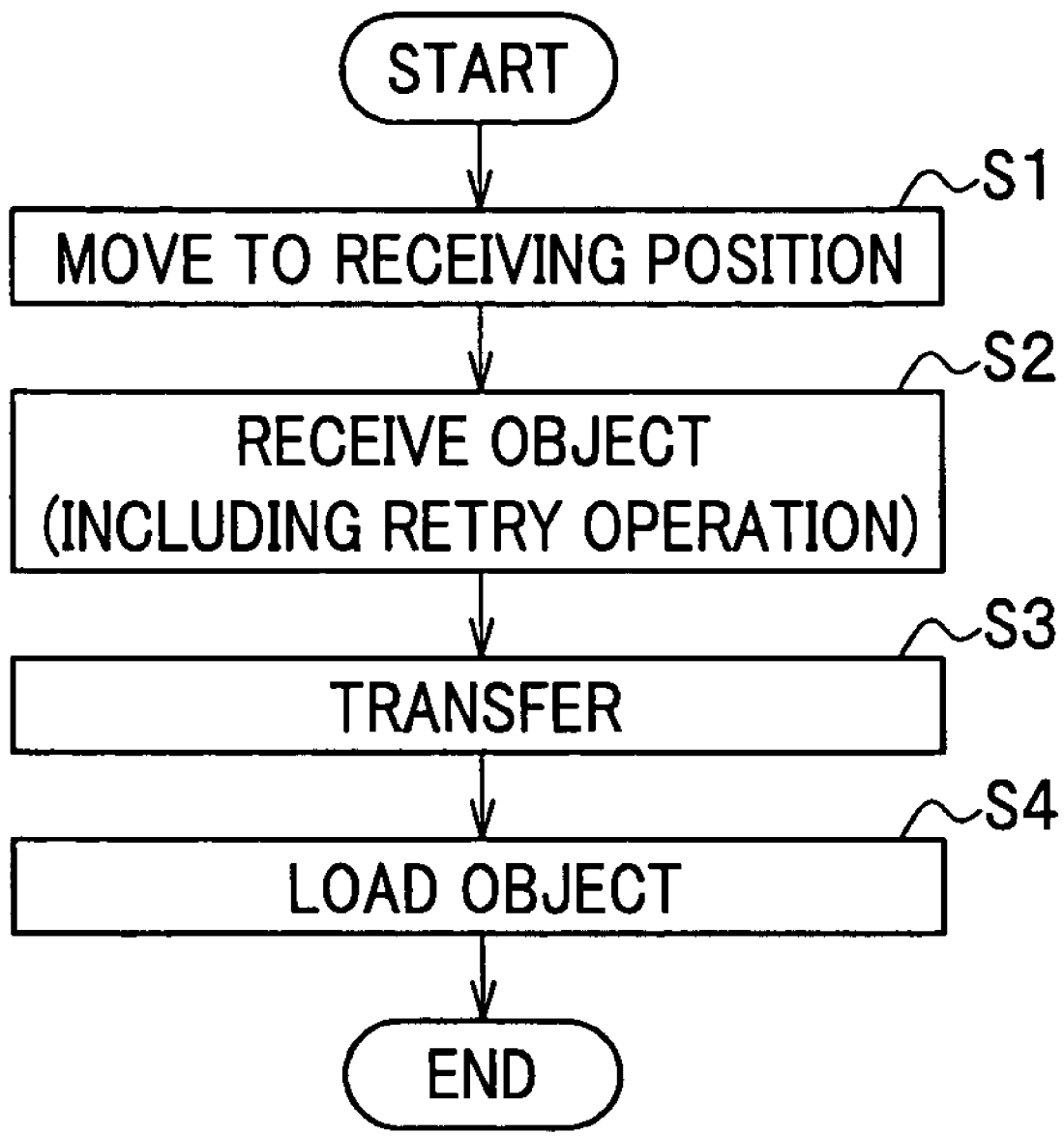
FIG. 5 is a flow chart explaining an overall operation of the legged mobile robot.

With reference to a flow chart of FIG. 5, descriptions will be given on an overall operation from receiving an object to loading the object, which is performed by the legged mobile robot R (see FIGS. 2, 3, 4 if necessary).

<Moving Operation to Receiving Position>

An explanation will be given on a moving operation of moving to a receiving position where the legged mobile robot R receives the object (S1).

First, the legged mobile robot R is in a standby state at a predetermined home-position. When the legged mobile robot R receives execution-instruction signals from the robot manager 4, the legged mobile robot R starts moving from the home-position to a usual location of a person (see "person data" in <Storage Device>). When arriving at the usual location of the person, the legged mobile robot R stops the moving operation, and starts looking for the person. If a tag identifier of the person is detected by the object detector 120, the legged mobile robot R acquires an image of the person by using cameras C, C, and moves toward the person.

If the legged mobile robot R does not detect the tag identifier of the person within a predetermined time period, the legged mobile robot R generates operation report signals reporting that it is impossible to perform the current task, outputs the signals to the robot manager 4, and then returns to the home-position.

<Receiving Operation>

A description will be provided on a receiving operation to receive the object (tray) performed by the legged mobile robot R (S2).

When arriving at the receiving position, the legged mobile robot R holds out the gripers 71R, 71L with the thumb and the fingers open at a predetermined receiving height. At this time, the legged mobile robot R holds out the grippers 71R, 71L in such a manner that a distance from each gripper 71 to the person becomes constant, and the grippers 71R, 71L are held out toward a center (central vertical line) of the person which is calculated by the mobile object extraction unit 102.

After completion of holding-out of the grippers 71R, 71L, a receiving status of the legged mobile robot R becomes a "standby for receiving" mode, and utters "Please, give me the object (tray)". During staying in the "standby for receiving" mode, if the legged mobile robot R detects that an external force Fx is greater than Fx1 on the 6 axis force sensors 62R, 62L, the receiving status is set in a "receiving" mode, so that the legged mobile robot R starts to close (the thumbs and the fingers of) the grippers 71R, 71L. During staying in the "receiving" mode, if the legged mobile robot R detects on the 6 axis force sensors 62R, 62L that an external force Fx becomes Fx2 or less, or the grip angle deviation θ becomes a predetermined value of θ1 or less, the receiving status is set in a "completion of receiving" mode.

If an open angle of the gripper 71R (71L), that is, the grip angle deviation θ equals to a predetermined value of θ3 or more, it is determined that the object is thick and the grippers 71R, 71L have both gripped the object, and the receiving status is set in a "completion of gripping" mode.

If at least one of the grippers 71R, 71L has a grip angle deviation θ less than θ3, the receiving status is set in a "determining of gripping" mode, and determines whether or not the legged mobile robot R is gripping the object.

Specifically, in the "determining of gripping" mode, the legged mobile robot R, while opening and closing the thumb and the fingers of each gripper 71, detects a reaction force Fy from the object on the 6 axis force sensors 62R, 62L. If the reaction force Fy equals to a predetermined value of Fy1 or more, it is determined that the gripping is succeeded, and the receiving status is set in a "completion of receiving", and at the same time, the grippers 71R, 71L grip the object. If the reaction force Fy is less than Fy1, it is determined that the gripping fails, and the receiving status is set in a "fail in gripping".

<Retry Operation>

Now, an explanation will be give on a retry operation.

If the receiving status of the grippers 71R, 71L is set in the "fail in receiving", and at least one of the 6 axis force sensors 62R, 62L detects that the external force Fy equals to a predetermined value of Fy2 or more, the receiving status is set in a "standby for hand-over", and the legged mobile robot R utters, "Please, take up the tray and give it to me again".

If the legged mobile robot R detects that the external force Fx equals to a predetermined value of Fx5 or more at least one of the 6 axis force sensors 62R, 62L on which the object (tray) is gripped, the receiving status is set in a "handing over", and the gripper 71R (71L) opens the thumb and the fingers, and then the legged mobile robot R retries the receiving operation.

If the grip angle deviation θ equals to a predetermined value of θ(for example, θ=0) or less, the legged mobile robot R utters, "Please give me the object (tray) again", and the grippers 71R, 71L open the thumb and the fingers thereof, and then the receiving operation is retried.

<Transfer Operation>

A description will be given on an object transfer operation (S3).

After the operation of gripping the object is completed, the legged mobile robot R moves the grippers 71R, 71L toward a location out of the image zone where the cameras C, C can take images (blind spot). This operation is to prevent the gripped object (tray) from blocking sight of the cameras C, C. The legged mobile robot R starts to move from the receiving position to a position in vicinity of the target place (loading place) When arriving at the position in vicinity of the target place, the legged mobile robot R stops moving and starts to look for the target place.

<Loading Operation>

The legged mobile robot R, which has reached the position in vicinity of the target place, performs the loading operation to load the object on the target place (S4). The legged mobile robot R, after completion of the loading operation, returns to a status of gripping no object, and then moves back to the home-position.

A detailed explanation will be given on the loading operation with reference to FIG. 6.

Detailed Operation in Loading Operation by Legged Mobile Robot R

Figure 6:
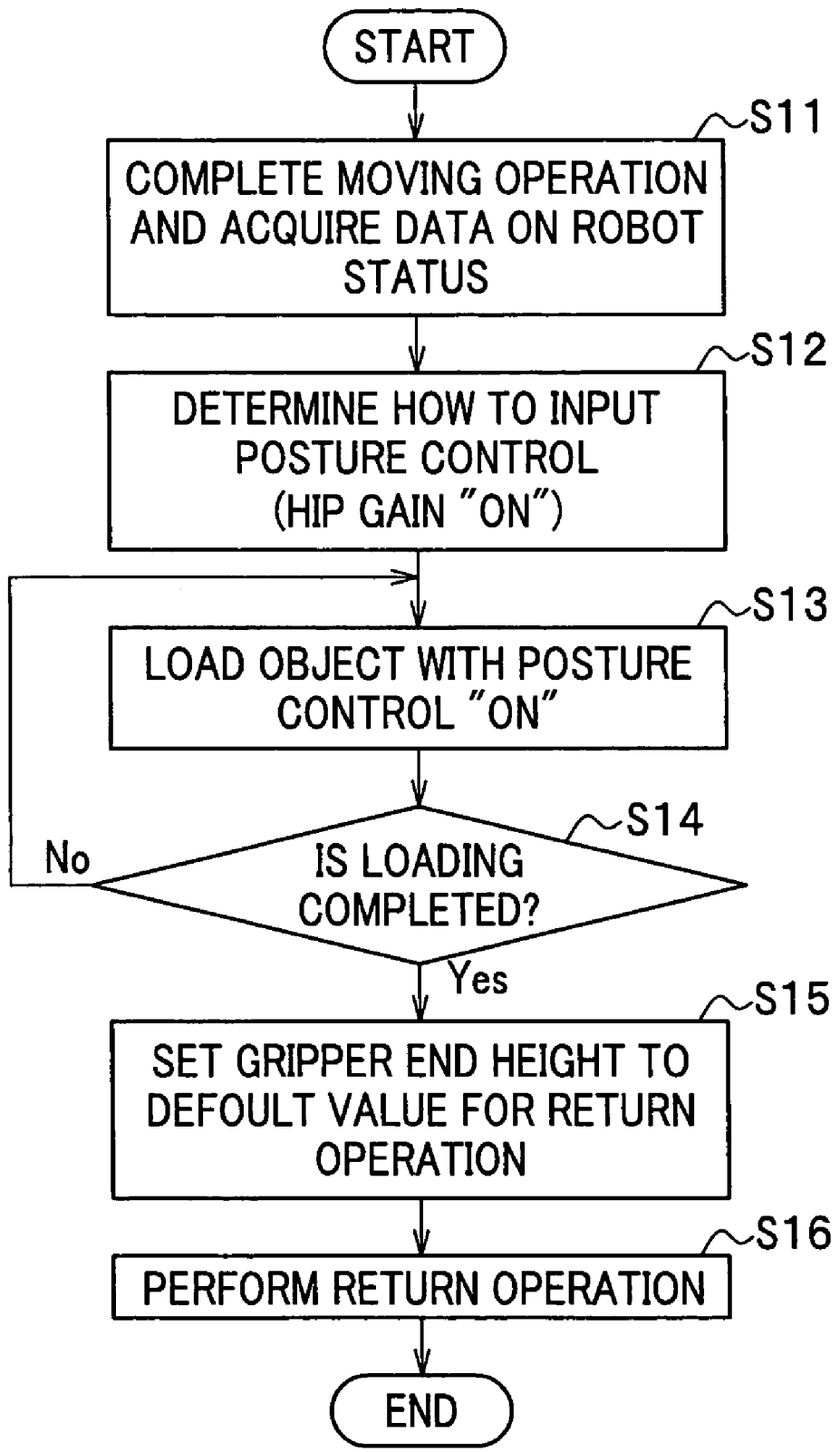
FIG. 6 is a flow chart explaining a loading operation of various operations of the legged mobile robot.

FIG. 6 shows a flow chart for explaining the legged mobile robot R's operation of loading the object on the target place (on the table) controlled by the legged mobile robot controller 1 (see FIGS. 2, 3, 4 if necessary).

The legged mobile robot controller 1, after the transfer operation (after arriving at the position in vicinity of the target place), acquires posture/position data showing the legged mobile robot R's status from the data acquire unit 3 (S11).

Specifically, the legged mobile robot controller 1 inputs posture/position data on the shoulder joints 31R to 33R, and posture/position data on the joint part between the leg portions R1 and the body R2 by the posture control input subunit 3a included in the data acquire unit 3. The legged mobile robot controller 1 also acquires, by the current wrist posture acquisition subunit 3b, each angle of the arm joints 35R, 35L for swirling each wrist, of the wrist joints 36R, 36L about the pitch axis (Y axis) of each wrist and of the wrist joints 37R, 37L about the roll axis (X axis) of each wrist; and inputs each position of the ankle joints 16R, 16L. Then, the legged mobile robot controller 1 inputs positions of the ankle joints 16R, 16L and positions of the grippers 71R, 71L (gripper end positions) by the desired gripper end position input unit 3c.

Following the above steps, by the whole-body cooperative motion control unit 5, the legged mobile robot controller 1 determines how to input the posture control, based on the posture/position data on each link position acquired by the data acquire unit 3, in order to control motions of the arm portions R3 and the leg portions R1 such that the acquired posture/position data on each link position agrees with a whole-body plan providing information on a predetermined series of posture changes of the legged mobile robot R (hip gain "ON") (S12). Specifically, the legged mobile robot controller 1 determines the order of processing the posture/position data so as to cooperatively control the whole-body posture of the legged mobile robot R; and by providing the cooperatively control on the whole-body posture, an operation zone for loading the object on the target place is secured.

In other words, the legged mobile robot controller 1 secures the operation zone by providing a control of the whole-body cooperative motion control unit 5 so as to compensate the stick-out at the apexes of the polyhedron, which is formed by connecting the apexes thereof corresponding to each position of the gripper ends (positions of the grippers 71R, 71L), the shoulders (positions of the shoulder joints 31R(L) to 33R(L)), the hip (positions of the joint part between the leg portions R1 and the body R2) and the heals (positions of the ankle joints 16R(L)).

The legged mobile robot controller 1 starts to load the object on the target place in a condition that the posture control is set to "ON", that is, in a condition of securing the operation zone (S13).

At this time, by use of the whole-body cooperative motion control unit 5, the legged mobile robot controller 1 controls each angle of the arm joints 35R, 35L for swirling the wrists, the wrist joints 36R, 36L about the pitch axis (Y axis) of each wrist, and the wrist joints 37R, 37L about the roll axis (X axis) of each wrist not to exceed a threshold value (to avoid a limit), so as to maintain the object in parallel to a horizontal plane.

The legged mobile robot controller 1 inputs the external force data regarding the external force affecting the gripper or grippers 71 by the position compliance input subunit 3d, and determines on detection subunit 7a included in the loading detection unit 7 whether or not the external force becomes the predetermined value or more, whereby determining whether or not the object is loaded (S14). Specifically, the loading detection unit 7 determines that the object is loaded on the target place if the external force data becomes the predetermined value or more, that is, if the external force affecting the gripper or grippers 71 becomes the predetermined value or more, it implies that the gripper or grippers 71 securely touches the target place. When loading the object on the target place, the legged mobile robot R may utters, "I made some tea for you", through the audio synthesis unit 111 of the audio processor 110 and the speaker S.

On the detection subunit 7a included in the loading detection unit 7, the legged mobile robot controller 1 does not determine that the loading is completed until the external force data becomes the predetermined value or more ("No" at S14). In this case, the legged mobile robot controller 1 returns to S13 to continue the loading operation. The legged mobile robot controller 1 determines that the loading is completed if the external data becomes the predetermined value or more ("Yes" at S14). After completing the loading operation, the legged mobile robot controller 1 sets the current height of the arm portions R3 to a default value for the return operation (i.e. operation of putting the arm portions R3 down to the side of the body R2 respectively, or return to a state of having no object) (S15), and resets the hip gain "ON" and starts the return operation (S16). In the return operation, the legged mobile robot R operates in such a manner that the robot R puts down the arm portions R3, and stretches the bend of the leg portions R1 at the joint part between the leg portions R1 and the body R2 so that the position of the joint part meets a line along the vertical direction of the center of gravity, whereby returning to the original posture.

Operation Conditions and Operation Region of Legged Mobile Robot R

With reference to FIG. 7 and FIGS. 9 to 11, explanations will be given on the operation conditions of the legged mobile robot R in comparison with a conventional control (i.e. without control by the legged mobile robot controller 1), as well as on the operation zone of Legged Mobile Robot R in a specific example.

Figure 7A:
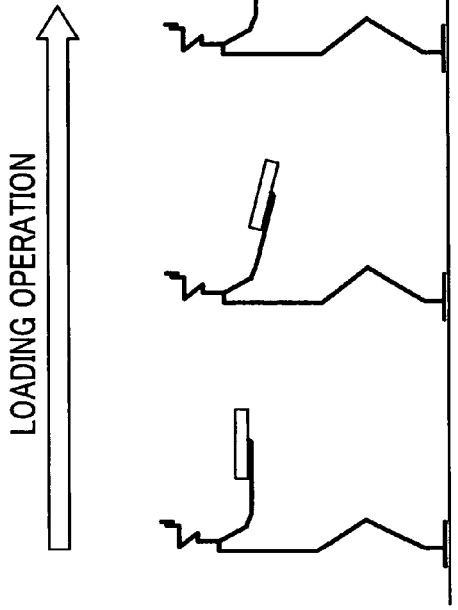
FIGS. 7A to 7C are schematic diagrams showing each sequence of transfer, loading and return operations of the legged mobile robot.
Figure 7B:
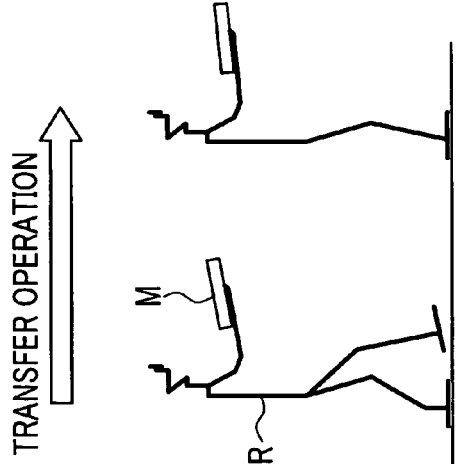
Figure 7C:
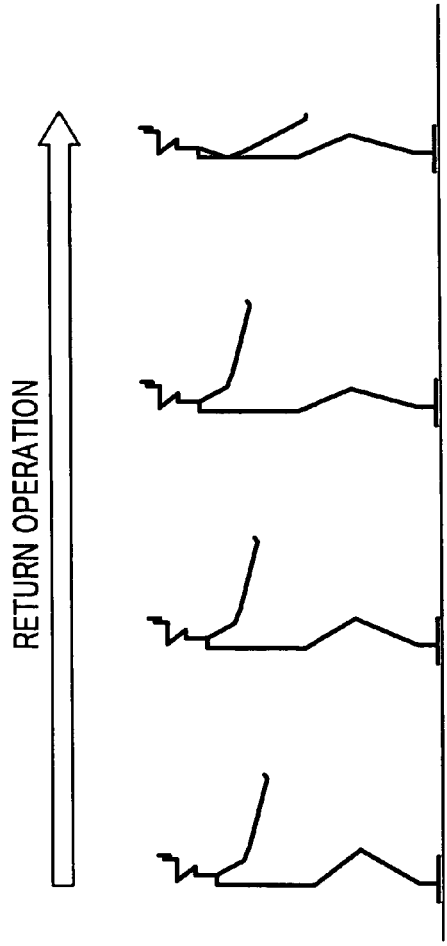

In FIG. 7, the legged mobile robot R and a series of operations thereof are depicted with straight lines for simplification. FIG. 7A shows the transfer operation of the legged mobile robot R, FIG. 7B shows the loading operation, and FIG. 7C shows the return operation, and a sequential direction of each operation is represented by an arrow, respectively.

As shown in FIGS. 7, the legged mobile robot R moves towards a target place S with gripping an object M, and then loads the object M on the target place S (particularly see a right-most figure in FIG. 7B). The legged mobile robot controller 1 detects the completion of the loading operation based on the reaction force from the target place S and the arm portions R3 (grippers 71, see FIG. 2) when the legged mobile robot R loads the object M on the target place S, that is, by using the compliance control.

FIGS. 9 and 10 show differences between a case in which there is provided a control by use of the legged mobile robot controller 1 (controlled) and a case in which there is provided no control thereby (uncontrolled), when legged mobile robot R performs the loading operation.

FIG. 9A shows the controlled case and FIG. 9B shows the uncontrolled case.

As shown in FIG. 9B, in the uncontrolled case, if performing the loading operation, the legged mobile robot R not only secures no operation zone but also inclines backward as shown in a bold broken line of FIG. 9B. Meanwhile, in the controlled case as shown in FIG. 9A, the legged mobile robot. R compensates the stick-out at the apexes of the polyhedron formed by connecting 8 points of the body (both shoulders), the gripper ends, the hip (joint part between the body and the leg portions) and ankles, so as to secure the operation zone depicted with hatching, while maintaining an excellent balance of the whole body. The polyhedron may be formed by using the knee positions in stead of the ankle positions as the apexes thereof, as shown in FIG. 9A.

Figure 10C:
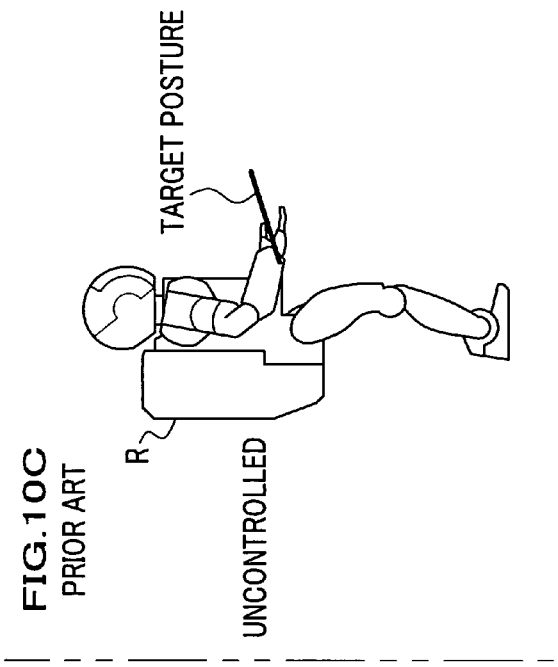
FIGS. 10A to 10D are drawings showing differences between an uncontrolled case and a controlled case by the legged mobile robot controller, regarding a compliance control on arm portions and a compensation of wrist movable angle.
Figure 10D:
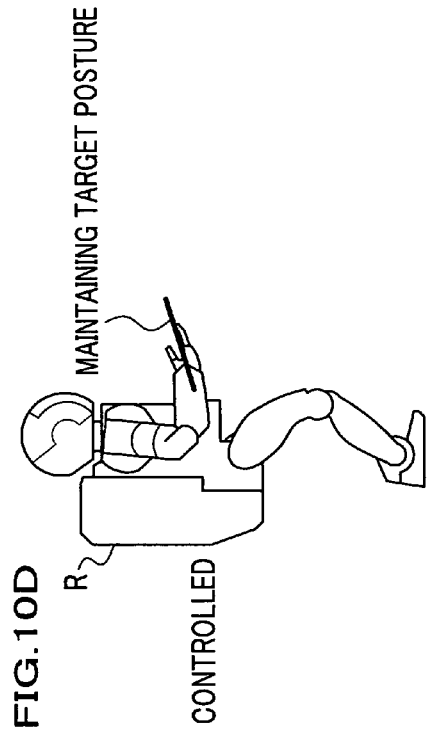
Figure 10A:
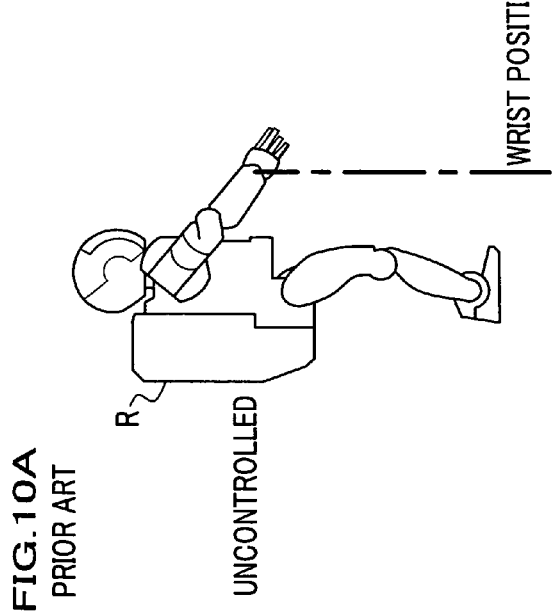
Figure 10B:
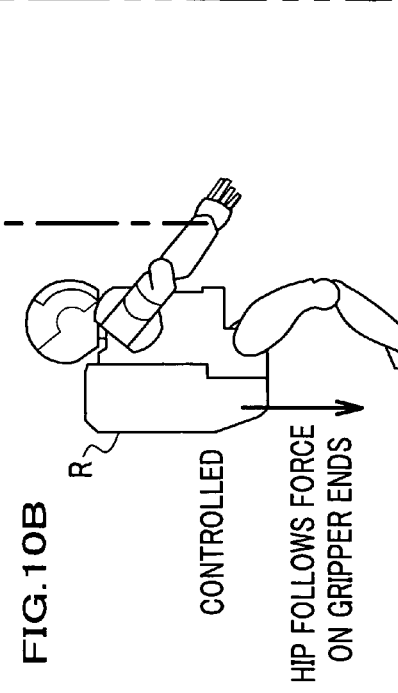

FIGS. 10A and 10C show the uncontrolled case, and FIGS. 10B and 10D show the controlled case.

As for a motion "following the arm compliance control" with reference to FIG. 10, in the uncontrolled case (FIG. 10A), the hip (joint part between the body and the leg portions) does not move (follow) in accordance with a force applied on the gripper ends. On the other hand, in the controlled case (FIG. 10B), the hip (joint part between the body and the leg portions) moves (follows) in accordance with a force applied on the gripper ends.

As for a motion "compensating the wrist movable angle", in the uncontrolled case (FIG. 10C), the gripper ends do not follow the desired posture, meanwhile in the controlled case (FIG. 10D), the gripper ends follow and maintain the desired posture.

Figures 11A, 11B:
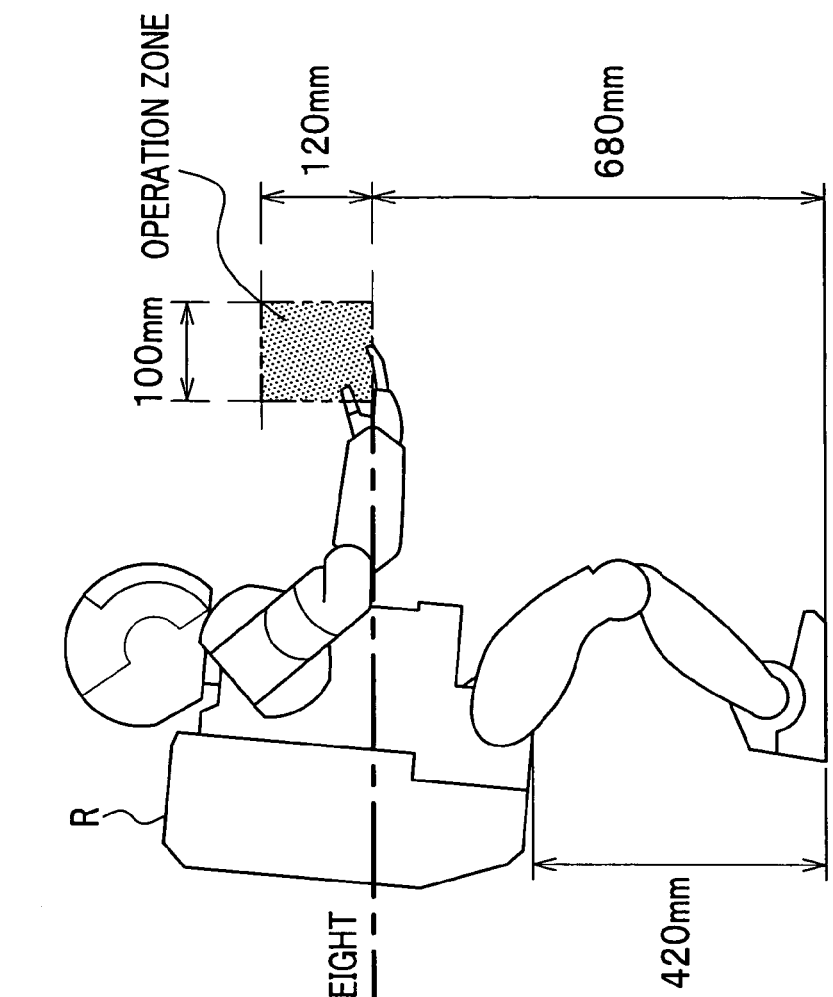
FIGS. 11A and 11B are drawings showing a difference between an uncontrolled case and a controlled case by the legged mobile robot controller, regarding a specific operation zone.
Figure 12:
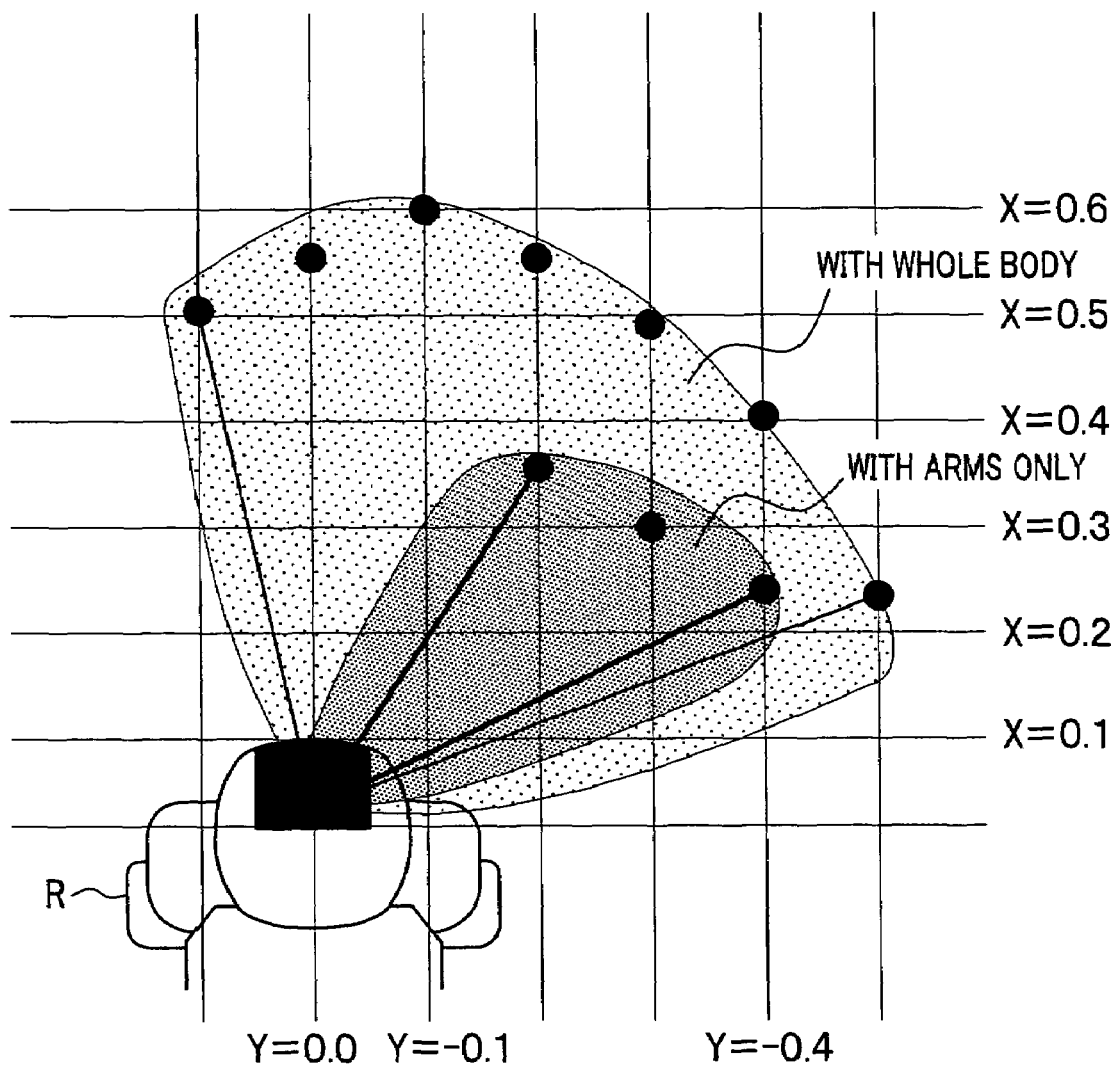
FIG. 12 is a plan view showing secured zones for the operation zone of FIG. 11.

FIGS. 11 and 12 specifically show the difference between the case in which there is provided the control by use of the legged mobile robot controller 1 (controlled) and the case in which there is provided no control thereby (uncontrolled), when the legged mobile robot R performs the loading operation.

FIG. 11A shows the uncontrolled case, and FIG. 11B shows the controlled case.

With reference to FIG. 11B, it can be seen that the legged mobile robot R can put the hip (waist) down to a height of 420 mm from the ground plane, and secure the operation zone having a width of 100 mm and a height of 120 mm (680 m to 800 m from the ground surface) as depicted with hatching in FIG. 11B.

FIG. 12 shows secured zones for the operation zone of FIG. 11 seen from the top of the legged mobile robot R. "With Arm Only" represents a secured zone for the operation zone in the uncontrolled case, and "With Whole-body" represents a secured zone for the operation zone in the controlled case. The controlled case ("With Whole-body") can secure an operation zone as large as twice or more of the uncontrolled case ("With Arm Only") on a planar basis, as shown in FIG. 12.

In other words, the controlled case "With Whole Body" secures the operation zone by bending the hip joints 12R(L) and the knee joints 14R(L) of the legged mobile robot R's leg portions R1.

As describe above, there have been explanations provided on the embodiment of the present invention. However, the embodiment is not limited thereto. For example, although there have been provided explanations chiefly on the legged mobile robot controller 1 in the embodiment of the present invention, the explanations may be applied on a method or methods into which the legged mobile robot controller 1 is incorporated.

The legged mobile robot R can be changed or modified in the design thereof such as the numbers of joints and positions.

According to the embodiment of the present invention, it is possible to provide a legged mobile robot that loads a gripped object on a target place having a height where a stretchable range of arm portions thereof is enhanced, with no operator's handling, while maintaining a posture of the legged mobile robot in accordance with a predetermined posture model based on the posture/position data. It is also possible for the legged mobile robot to load the gripped object in parallel with no operator's handling, as far as the target place has a height within a predetermined range.

The embodiment according to the present invention has been explained as aforementioned. However, the embodiment of the present invention is not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A legged mobile robot controller for controlling a legged mobile robot comprising arm portions for gripping an object, each arm potions having links; leg portions for moving, each leg portion having links; a main body of the legged mobile robot joined to the arm portions and the leg portions, based on posture/position data regarding a posture and a position of each link of the legged mobile robot and on an external force data regarding an external force affecting the arm portion or portions thereof,
the legged mobile robot controller comprising:
a data acquire unit for acquiring the posture/position data and the external force data;
a whole-body cooperative motion control unit for controlling motions of the leg portions in accordance with motions of the arm portions, based on the posture/position data acquired by the data acquire unit, when the legged mobile robot loads the gripped object with the arm portions on a target place; and
a loading detection unit for detecting that the gripped object with the arm portions has been loaded on the target place by the motions controlled by the whole-body cooperative motion control unit, based on the external force data acquired by the data acquire unit,
wherein
the whole-body cooperative motion control unit controls in such a manner that, if the loading detection unit detects that the gripped object is not loaded on the target place when a position of the arm is put down or stretched, each link of the leg portions is bent at part where each link is jointed to each other.

2. The legged mobile robot controller according to claim 1, wherein the whole-body cooperative motion control unit controls in such a manner that each link of the leg portions is bent at part where each link is jointed to each other while the gripped object gripped with the arm portions is maintained in parallel.

3. A legged mobile robot comprising the legged mobile robot controller according to claim 2.

4. A legged mobile robot comprising the legged mobile robot controller according to claim 1.

5. A legged mobile robot controller for controlling a legged mobile robot comprising arm portions for gripping an object, each arm potions having links; leg portions for moving, each leg portion having links; a main body of the legged mobile robot joined to the arm portions and the leg portions, based on posture/position data regarding a posture and a position of each link of the legged mobile robot and on an external force data regarding an external force affecting the arm portion or portions thereof,
the legged mobile robot controller comprising:
a data acquire unit for acquiring the posture/position data and the external force data;
a whole-body cooperative motion control unit for controlling motions of the leg portions and the arm portions when the legged mobile robot loads the object gripped with the arm portions on a target place based on the posture/position data acquired by the data acquire unit, the motions of the leg portions and the arm portions being controlled in such a manner that:
a polyhedron is assumed, which is formed by connecting all the points of each part or link of the arm portions and the leg portions, each which becomes an apex of the polyhedron, where a motion at some apexes of the polyhedron is compensated by a motion at other apexes thereof, and
a loading detection unit for detecting that the gripped object with the arm portions has been loaded on the target place by the motions controlled by the whole-body cooperative motion control unit, based on the external force data acquired by the data acquire unit,
wherein
the apexes of the polyhedron at least comprises:
positions of gripper ends that are part of the arm portion;
movable positions of the links at which the arm portions and the main body are joined to each other;
movable positions of the links at which the leg portions and the main body are joined to each other; and
positions of heels or knees that are part of the leg portions.

6. The legged mobile robot controller according to claim 5, wherein
the polyhedron comprises a first pair of the apexes and a second pair of the apexes, which are disposed diagonally to each other,
the first pair of the apexes of the polyhedron comprises apexes of the right and left side faces that stand opposite to each other,
the second pair of the apexes of the polyhedron comprises apexes of the right and left side faces that stand opposite to each other, and
the whole-body cooperative motion control unit controls the motions of the arm portions and the leg portions in such a manner that:
if the polyhedron sticks out at either of the first pair or the second pair of the apexes of the polyhedron which are disposed diagonally to each other from a predetermined reference polyhedron at a corresponding pair of apexes thereof, the other pair of the apexes of the polyhedron also sticks out from the predetermined reference polyhedron at a corresponding pair of apexes thereof,
so as to compensate the motion at some apexes of the polyhedron by the motion at other apexes thereof.

7. The legged mobile robot controller according to claim 6, wherein
the legged mobile robot comprises the arm portions and the leg portions on right and left sides respectively,
the polyhedron comprise a first side face and a second side face that are standing opposite to each other, and
the first side face is formed by connecting apexes comprising:

a position of a gripper end that is part of the right arm portion;

a movable position of the link at which the right arm portion and the main body are joined to each other;

a movable position of the link at which the right leg portion and the main body are joined to each other; and a position of a heel or a knee that is part of the right leg portion, each which becomes an apex of the first side face and the second side face is formed by connecting apexes comprising:

a position of a gripper end that is part of the left arm portion;

a movable position of the link at which the left arm portion and the main body are joined to each other;

a movable position of the link at which the left leg portion and the main body are joined to each other; and a position of a heel or a knee that is part of the left leg portion, each which becomes an apex of the second side face, wherein the whole-body cooperative motion control unit controls in such a manner that the first and the second side faces synchronously change each shape thereof while maintaining the identical shape each other in accordance with changes in posture or position of each part or link of the legged mobile robot.

8. A legged mobile robot comprising the legged mobile robot controller according to claim 7.

9. A legged mobile robot comprising the legged mobile robot controller according to claim 6.

10. The legged mobile robot controller according to claim 5, wherein the whole-body cooperative motion control unit controls in such a manner that each link of the leg portions is bent at part where each link is jointed to each other while the gripped object gripped with the arm portions is maintained in parallel.

11. A legged mobile robot comprising the legged mobile robot controller according to claim 5.

12. A legged mobile robot control method for controlling a legged mobile robot comprising arm portions for gripping an object, each arm potions having links; leg portions for moving, each leg portion having links; a main body of the legged mobile robot joined to the arm portions and the leg portions, based on posture/position data regarding a posture and a position of each link of the legged mobile robot and on an external force data regarding an external force affecting the arm portion or portions thereof, the legged mobile robot control method comprising steps of:

by a data acquire unit, acquiring the posture/position data and the external force data;

by a whole-body cooperative motion control unit, controlling motions of the leg portions in accordance with motions of the arm portions, based on the posture/position data acquired by the data acquire unit, when the legged mobile robot loads the gripped object with the arm portions on a target place; and by a loading detection unit, detecting that the gripped object with the arm portions has been loaded on the target place by the motions controlled by the whole-body cooperative motion control unit, based on the external force data acquired by the data acquire unit, wherein the whole-body cooperative motion control unit controls in such a manner that, if the loading detection unit detects that the gripped object is not loaded on the target place when a position of the arm is put down or stretched, each link of the leg portions is bent at part where each link is jointed to each other.

13. The legged mobile robot control method according to claim 12, wherein, in the controlling step by the whole-body cooperative motion control unit, the whole-body cooperative motion control unit controls in such a manner that each link of the leg portions is bent at part where each link is jointed to each other while the gripped object gripped with the arm portions is maintained in parallel.

14. A legged mobile robot control method for controlling a legged mobile robot comprising arm portions for gripping an object, each arm potions having links; leg portions for moving, each leg portion having links; a main body of the legged mobile robot joined to the arm portions and the leg portions, based on posture/position data regarding a posture and a position of each link of the legged mobile robot and on an external force data regarding an external force affecting the arm portion or portions thereof, the legged mobile robot control method comprising steps of:

by a data acquire unit, acquiring the posture/position data and the external force data;

by a whole-body cooperative motion control unit, controlling motions of the leg portions and the arm portions when the legged mobile robot loads the object gripped with the arm portions on a target place based on the posture/position data acquired by the data acquire unit, the motions of the leg portions and the arm portions being controlled in such a manner that:

a polyhedron is assumed, which is formed by connecting all the points of each part or link of the arm portions and the leg portions, each which becomes an apex of the polyhedron, where a motion at some apexes of the polyhedron is compensated by a motion at other apexes thereof, and by a loading detection unit, detecting that the gripped object with the arm portions has been loaded on the target place by the motions controlled by the whole-body cooperative motion control unit, based on the external force data acquired by the data acquire unit, wherein the apexes of the polyhedron at least comprise:

positions of gripper ends that are part of the arm portions;

movable positions of the links at which the arm portions and the main body are joined to each other;

movable positions of the links at which the leg portions and the main body are joined to each other; and positions of heels or knees that are part of the leg portions.

15. The legged mobile robot control method according to claim 14, wherein, in the controlling step by the whole-body cooperative motion control unit, the whole-body cooperative motion control unit controls the motions of the arm portions and the leg portions in such a manner that:

the polyhedron comprises a first pair of the apexes and a second pair of the apexes, which are disposed diagonally to each other, the first pair of the apexes of the polyhedron comprises apexes of the right and left side faces that stand opposite to each other, the second pair of the apexes of the polyhedron comprises apexes of the right and left side faces that stand opposite to each other, and if the polyhedron sticks out at either of the first pair or the second pair of the apexes of the polyhedron which are disposed diagonally to each other from a predetermined reference polyhedron at a corresponding pair of apexes thereof, the other pair of the apexes of the polyhedron also sticks out from the predetermined reference polyhedron at a corresponding pair of apexes thereof, so as to compensate the motion at some apexes of the polyhedron by the motion at other apexes thereof.

16. The legged mobile robot control method according to claim 15, wherein the legged mobile robot comprises the arm portions and the leg portions on right and left sides respectively, in the controlling step by the whole-body cooperative motion control unit, the whole-body cooperative motion control unit controls the motions of the arm portions and the leg portions in such a manner that:

the polyhedron comprises a first side face and a second side face that stand opposite to each other, the first side face is formed by connecting:

a position of a gripper end that is part of the right arm portion;

a movable position of the link at which the right arm portion and the main body are joined to each other;

a movable position of the link at which the right leg portion and the main body are joined to each other; and a position of a heel or a knee that is part of the right leg portion, each which becomes an apex of the first side face, and the second side face is formed by connecting:

a position of a gripper end that is part of the left arm portion;

a movable position of the link at which the left arm portion and the main body are joined to each other;

a movable position of the link at which the left leg portion and the main body are joined to each other; and a position of a heel or a knee that is part of the left leg portion, each which becomes an apex of the second side face, wherein the first and the second side faces synchronously change each shape thereof while maintaining the identical shape each other in accordance with changes in posture or position of each part or link of the legged mobile robot.

17. The legged mobile robot control method according to claim 14, wherein, in the controlling step by the whole-body cooperative motion control unit, the whole-body cooperative motion control unit controls in such a manner that each link of the leg portions is bent at part where each link is jointed to each other while the gripped object gripped with the arm portions is maintained in parallel.

* * * * *